(12) United States Patent
Zembrodt et al.

(10) Patent No.: US 11,649,562 B2
(45) Date of Patent: May 16, 2023

(54) ROTARY SPINNER APPARATUSES, METHODS AND SYSTEMS FOR PRODUCING FIBER FROM MOLTEN MATERIAL

(71) Applicants: KNAUF INSULATION, INC., Shelbyville, IN (US); Knauf Insulation Sprl, Vise (BE)

(72) Inventors: Robert W. Zembrodt, Indianapolis, IN (US); Matthew W. Revercomb, Indianapolis, IN (US); Roberto O. Pellizzari, Groton, MA (US)

(73) Assignees: Knauf Insulation Inc., Shelbyville, IN (US); Knauf Insulation SPRL, Vise (BE)

( * ) Notice: Subject to any disclaimer, the term of this patent is extended or adjusted under 35 U.S.C. 154(b) by 0 days.

(21) Appl. No.: 17/184,955

(22) Filed: Feb. 25, 2021

(65) Prior Publication Data
US 2021/0180212 A1 Jun. 17, 2021

Related U.S. Application Data

(63) Continuation of application No. PCT/US2019/048283, filed on Aug. 27, 2019.
(Continued)

(51) Int. Cl.
*D01D 5/18* (2006.01)

(52) U.S. Cl.
CPC ...................... *D01D 5/18* (2013.01)

(58) Field of Classification Search
CPC ... C03B 37/045; C03B 37/047; C03B 37/048; D01D 5/18; D01D 5/00
See application file for complete search history.

(56) References Cited

U.S. PATENT DOCUMENTS

| 3,245,768 A | 4/1966 | Simmers |
| 3,511,306 A * | 5/1970 | Warkoczewski ...... C03B 37/047 164/112 |

(Continued)

FOREIGN PATENT DOCUMENTS

| FR | 3057567 | 4/2018 |
| FR | 3060555 | 6/2018 |
| WO | 2018069652 | 4/2018 |

OTHER PUBLICATIONS

International Search Report and Written Opinion, PCT Appln. No. PCT/US19/48283, p. 11.

*Primary Examiner* — Emmanuel S Luk
(74) *Attorney, Agent, or Firm* — Taft Stettinius & Hollister LLP

(57) ABSTRACT

An apparatus for producing fibers from molten material includes a drive shaft rotatable about an axis, a slinger basket including a base, a side wall, and an interior void. The side wall extends axially upward from the base and includes a plurality of distribution holes. The interior void extends radially from the drive shaft to the side wall and extends axially from the base to an upper opening which extends radially outward from the drive shaft toward the upper flange. A spinner body is coupled with the slinger basket and includes a roof contacting and extending radially outward from the upper flange such that the upper opening is substantially unobstructed by the spinner body. A spinner side wall extends axially downward from the roof and includes a fiberizing region including a plurality of fiberizing holes provided therein.

33 Claims, 21 Drawing Sheets

Related U.S. Application Data

(60) Provisional application No. 62/723,132, filed on Aug. 27, 2018.

(56) References Cited

U.S. PATENT DOCUMENTS

| | | | | |
|---|---|---|---|---|
| 3,560,179 | A | | 2/1971 | Kleist |
| 3,644,108 | A | * | 2/1972 | Russell ................. C03B 37/048 65/511 |
| 4,203,745 | A | * | 5/1980 | Battigelli ............. C03B 37/047 65/461 |
| 4,545,796 | A | * | 10/1985 | Crosby ................. C03B 37/045 403/256 |
| 4,759,974 | A | | 7/1988 | Barthe et al. |
| 5,118,332 | A | * | 6/1992 | Hinze .................. C03B 37/047 65/469 |
| 5,326,241 | A | * | 7/1994 | Rook ....................... D01D 5/18 425/464 |
| 5,591,459 | A | * | 1/1997 | Snyder ................. C03B 37/045 425/72.2 |
| 5,743,157 | A | * | 4/1998 | Hinze .................. C03B 37/045 76/107.6 |
| 5,779,760 | A | * | 7/1998 | Watton ................. C03B 37/045 264/211.1 |
| 5,785,996 | A | * | 7/1998 | Snyder ..................... D01D 5/18 264/211.1 |
| 6,042,662 | A | * | 3/2000 | Bagard ............... C03B 37/0805 148/621 |
| 6,128,929 | A | * | 10/2000 | Peterson ............. C03B 37/0753 425/131.5 |
| 6,596,048 | B1 | * | 7/2003 | Tuffal .................... D21H 13/40 65/525 |
| 7,314,557 | B2 | | 1/2008 | Beaufils et al. |
| 8,869,567 | B2 | | 10/2014 | Boulanov et al. |
| 9,624,123 | B2 | * | 4/2017 | Zembrodt ............. C03B 37/047 |
| 11,505,490 | B2 | * | 11/2022 | Lahmar ................. C03B 37/045 |
| 2002/0116958 | A1 | * | 8/2002 | Johnson ................ C03B 37/047 65/492 |
| 2003/0203200 | A1 | * | 10/2003 | Skarzenski ............. D01D 5/18 428/392 |
| 2008/0156042 | A1 | * | 7/2008 | Gavin ................... C03B 37/045 65/520 |
| 2008/0236722 | A1 | * | 10/2008 | Charbonneau ....... D04H 1/4226 156/74 |
| 2009/0091056 | A1 | * | 4/2009 | Fabbricante ............. D01D 4/06 425/7 |
| 2012/0270718 | A1 | * | 10/2012 | Boulanov ............. C03B 37/045 501/36 |
| 2016/0040319 | A1 | * | 2/2016 | Zembrodt ............. D01D 13/00 425/382.2 |
| 2016/0115071 | A1 | | 4/2016 | Thiery et al. |
| 2017/0225999 | A1 | | 8/2017 | Zembrodt et al. |

* cited by examiner

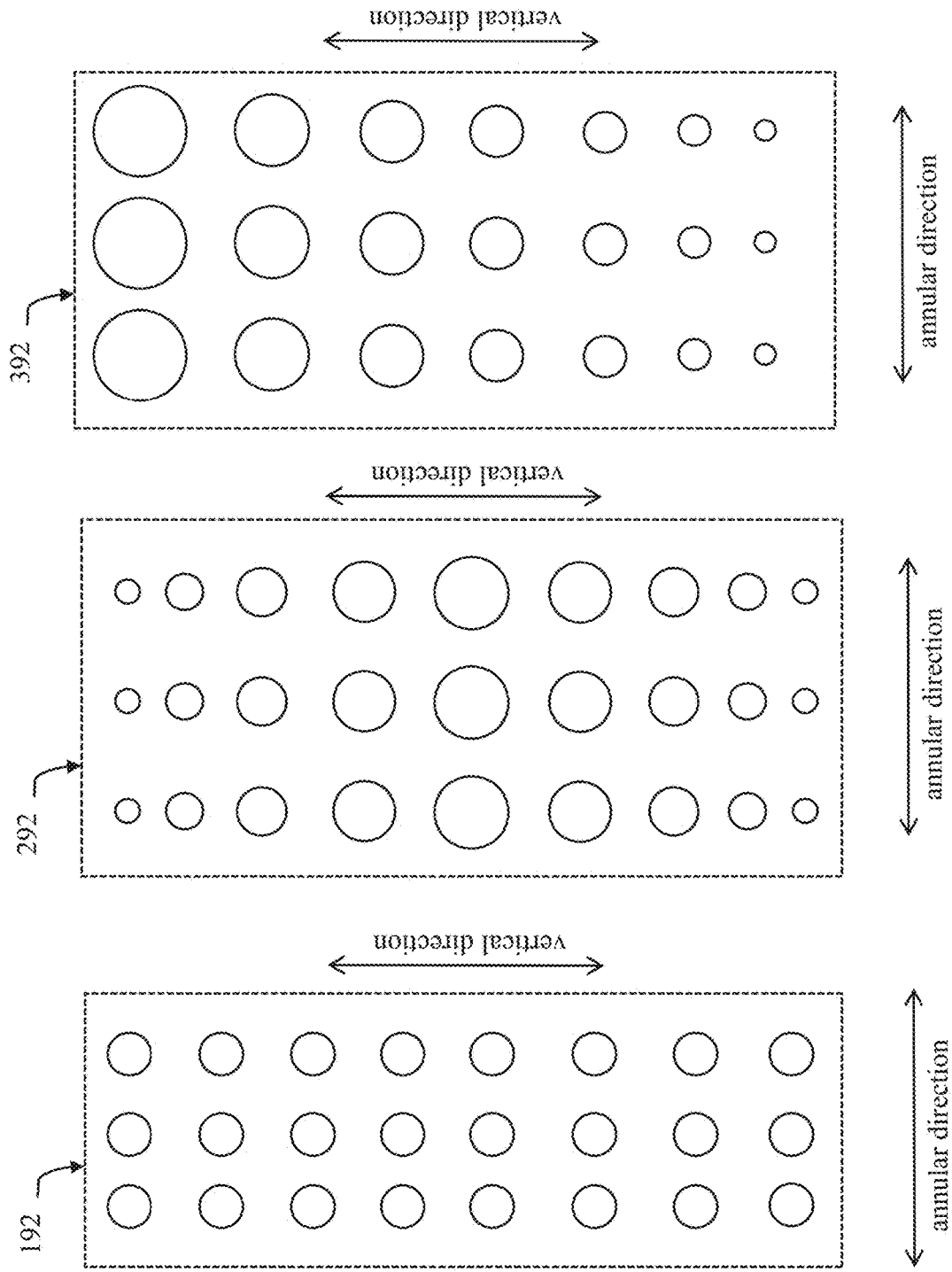

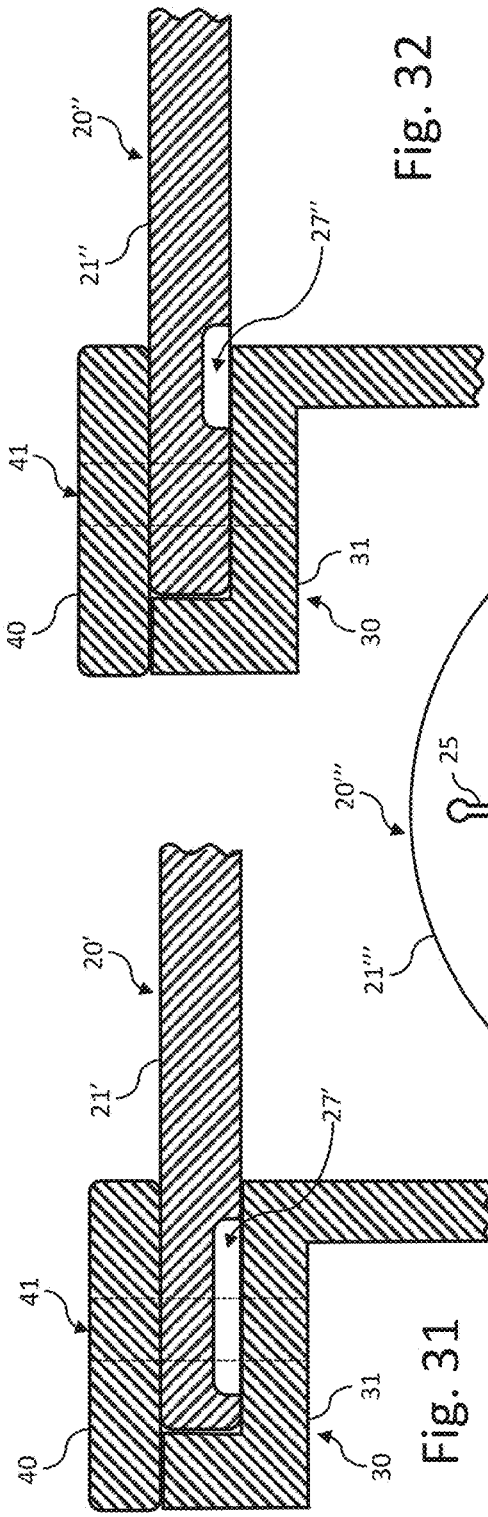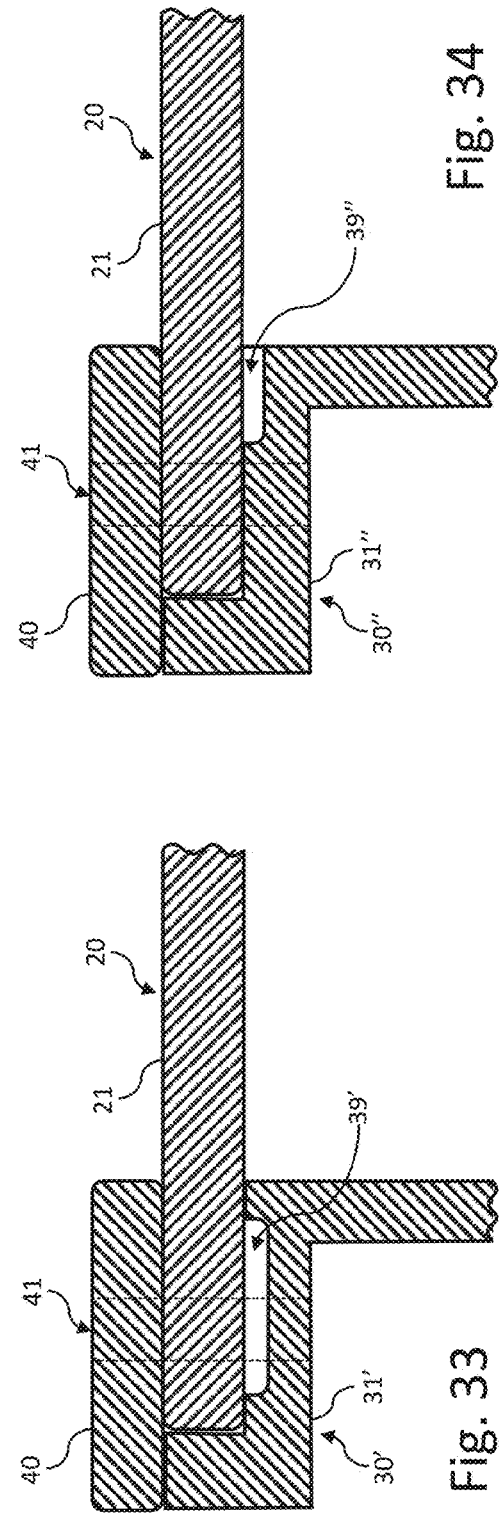

ROTARY SPINNER APPARATUSES, METHODS AND SYSTEMS FOR PRODUCING FIBER FROM MOLTEN MATERIAL

CROSS-REFERENCE TO RELATED APPLICATIONS

This application is a continuation of International PCT Application No. PCT/US19/48283 filed Aug. 27, 2019, which claims priority to U.S. Provisional Application Ser. No. 62/723,132 filed Aug. 27, 2018, the disclosure of which is hereby incorporated by reference.

BACKGROUND

The present application relates generally to rotary spinner apparatuses, systems and methods for producing fibers from molten materials. Rotary spinners are useful for producing fiber materials such as fiberglass, glass wool, rock wool, mineral wool, or mixtures thereof. The production process for such materials may include introducing molten materials comprising glass, rock, minerals, slag and/or other thermoplastic compositions into a rotating spinner, passing the molten material through fiberizing holes formed in a structure of the spinner via action of centrifugal force, impinging a stream of elevated temperature gas onto material exiting the spinner apertures to further attenuate the fibers exiting the fiberizing holes which are sometimes referred to as pre-fibers, adding binder compositions to the gas/fiber stream, and cooling and collecting the resulting fiber material. Spinners utilized in such processes are exposed to harsh operating conditions including mechanical stressing, thermal stressing and corrosion such as hot corrosion or oxidation. The performance and service longevity of spinners is negatively impacted by these conditions. Compounding these difficulties, the materials from which rotary spinners are formed face a trade-off between strength and corrosion resistance such that compositions exhibiting greater strength offer lesser corrosion resistance and vice-versa. Additional design challenges arise from competing design requirements. For certain products, fiber material with particular characteristics may be desired. At the same time, reducing the thermal and mechanical energy required for the operation of spinners would be desirable. Moreover, these and other design objectives may be in tension or conflict, leading to sub-optimal design trade-offs. Conventional attempts to address these challenges suffer from a number of drawbacks, disadvantages, and shortcomings. There remains a significant need for the unique apparatuses, systems, and methods disclosed herein.

DISCLOSURE OF ILLUSTRATIVE EMBODIMENTS

For the purposes of clarity, concisely and exactly describing illustrative embodiments of the present disclosure, the manner and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created and that the invention includes and protects such alterations, modifications, and further applications of the example embodiments as would occur to one skilled in the art.

BRIEF DESCRIPTION OF THE DRAWINGS

FIG. 15 is a schematic illustration of a first example fiberizing hole pattern.

FIG. 16 is a schematic illustration of a second example fiberizing hole pattern.

FIG. 17 is a schematic illustration of a third example fiberizing hole pattern.

FIGS. 31-34 are partial side section views of certain aspects of spinners according to several further example embodiments.

FIG. 35 is a partial top view of certain aspects of a spinner according to a further example embodiment.

DETAILED DESCRIPTION OF ILLUSTRATIVE EMBODIMENTS

Figure 1:
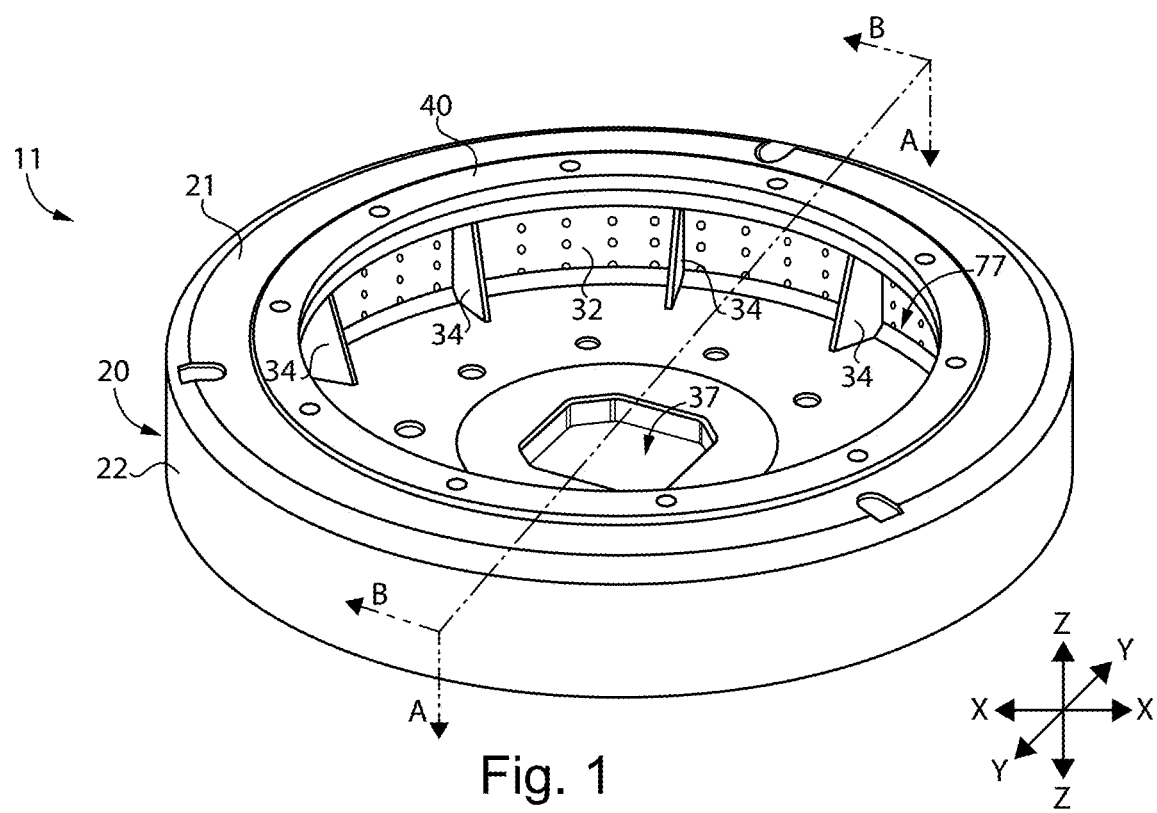
FIG. 1 is a perspective view of a spinner according to a first example embodiment.
Figure 1A:
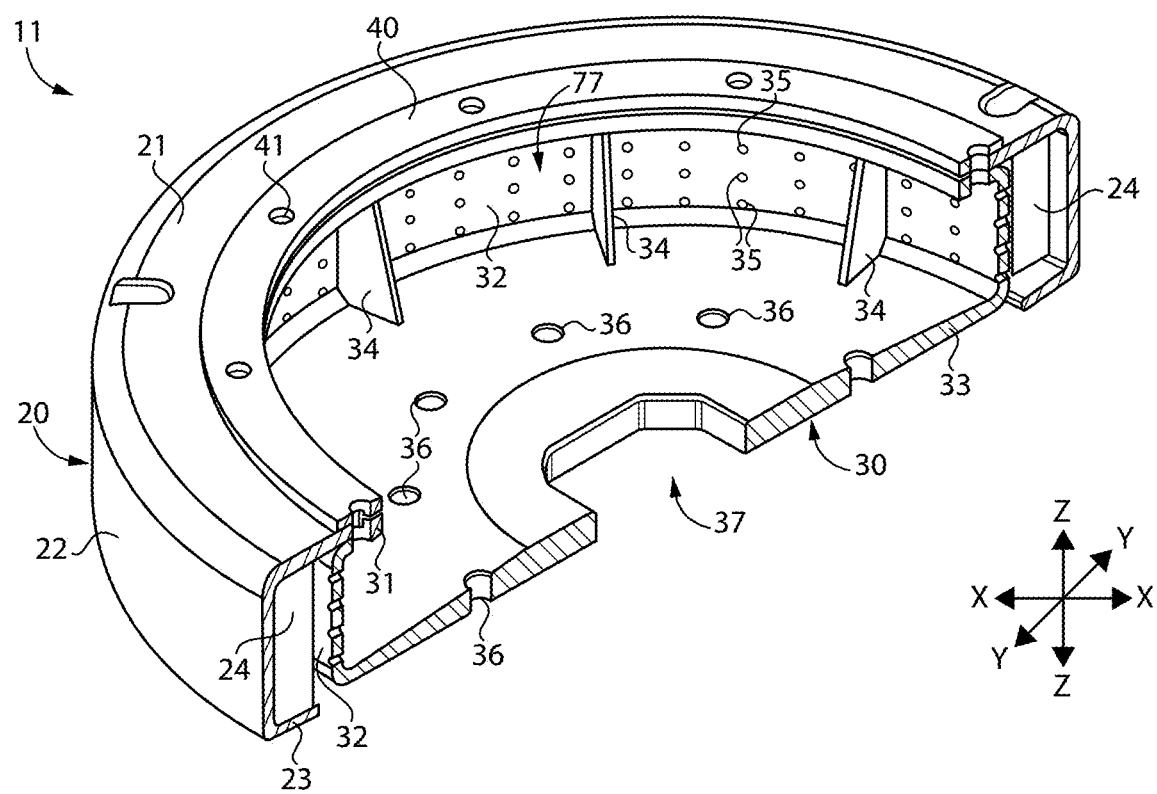
FIG. 1A is a perspective sectional view of the spinner according to the first example embodiment taken along arrow A-A of FIG. 1.
Figure 1B:
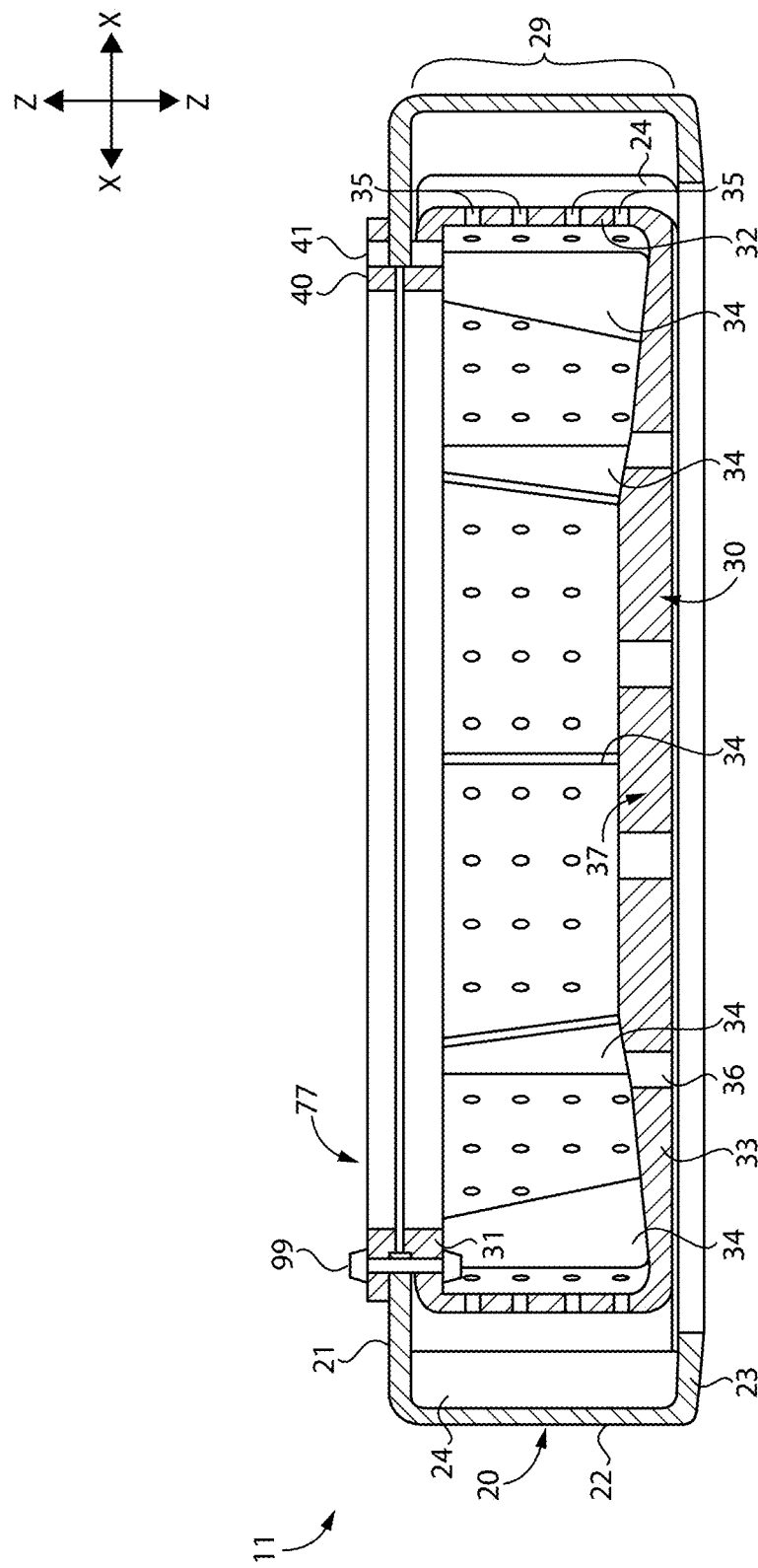
FIG. 1B is a side sectional view of the spinner according to the first example embodiment taken along arrow B-B of FIG. 1.

With reference to FIGS. 1, 1A, and 1B there are illustrated perspective, perspective sectional, and side sectional views, respectively, of a spinner 11 according to a first example embodiment. Spinner 11 includes a spinner body 20, a slinger basket 30 and a retaining ring 40 which are coupled together as an assembly. The spinner body 20 includes a top wall 21, a peripheral side wall 22 and a bottom wall 23. A plurality of gussets 24 are provided within the spinner body 20 and extend vertically between the top wall 21 and the bottom wall 23, and radially inward from the peripheral side wall 22. A plurality of rows of fiberizing holes are provided in the peripheral side wall 22 in a fiberizing region 29 which can substantially 100% of the interior height of peripheral side wall 22 and extends between a lower axial height and an upper axial height. It shall be appreciated that in other forms and embodiments, the fiberizing region 29 may extend over other percentages of the interior height of peripheral side wall 22, for example, greater than or equal to 80%, greater than or equal to 85%, greater than or equal to 90%, and greater than or equal to 95%. The fiberizing holes may be formed by laser drilling, electrical discharge milling (EDM), electron beam drilling or conventional drilling and are not depicted in the views of FIGS. 1, 1A, and 1B.

The slinger basket 30 of spinner 11 includes a top wall 31, an interior side wall 32 that is positioned between the center axis of the spinner 11 and the peripheral side wall 22 of the spinner body 20, a bottom wall 33 and an upper basket opening 77. In the assembled state, a portion of the top wall 21 of the spinner body 20 is positioned between the top wall 31 of the slinger basket 30 and the retaining ring 40 and spinner body 20, slinger basket 30, and retaining ring 40 are coupled together by bolts 99 that pass through bolt holes 41 in each component of the assembly and may apply a clamping force to the assembly. For clarity of illustration of the other features of spinner 11, only a single bolt 99 is depicted and is shown only in the sectional view spinner 11, it being appreciated that additional bolts 99 are provided in corresponding bolt holes 41 in the assembled form of spinner 11. In theory, the clamping force may be zero, although in practice at least some positive magnitude of clamping force is typically present. The clamping force may be selected to accommodate thermal expansion and contraction of the various components of the assembly including differential thermal expansion of different components. The bolts and bolt holes 41 may also be sized to provide radial clearance to permit such expansion or contraction.

The slinger basket 30 includes a plurality of distribution holes 35 provided in the interior side wall 32 of the slinger basket 30. Distribution holes 35 of slinger basket 30 comprise four rows of holes which are aligned to provide vertical columns of holes, but which may be offset or staggered in other forms. Distribution holes 35 are positioned such that during operation, molten material introduced into slinger basket 30 travels along the upper surface of bottom wall 33 to interior side wall 32, vertically up interior side wall 32, and is discharged from slinger basket 30 as streams flowing radially outward through each row of distribution holes 35. The streams of molten material discharged from distribution holes 35 are distributed across substantially all of the fiberizing region 29 in which fiberizing holes are located. Thus, during operation, a substantially uniform amount of molten material is provided along the height of fiberizing region 29, for example, as illustrated and described in connection with FIG. 5.

A plurality of vent holes 36 are provided in the bottom wall 33 of the slinger basket 30, although vent holes 36 may be omitted in certain forms. A plurality of gussets 34 are provided within the slinger basket 30 and extend vertically between the top wall 31 and the bottom wall 33, and radially inward from the interior side wall 32. A central opening 37 is provided in the bottom wall 33 and is configured to receive a square drive member of a drive shaft that rotates the spinner 11 during operation.

The distribution holes 35 are provided in a pattern including several annularly extending rows of distribution holes. In the illustrated form of spinner 11, the pattern of distribution holes is continuous and uninterrupted such that neither the gussets nor any other structure interrupts or interferes with any of the rows of distribution holes. In the illustrated form, the same is true of the vent holes 36 which are provided in the bottom wall 33 of the slinger basket 30. It is nevertheless contemplated that in other forms of spinner 11 the pattern of distribution holes may be interrupted by gussets or other reinforcing structures.

It shall be appreciated that spinner 11 is one example of a rotary spinner including a slinger basket coupled with a spinner body for producing fibers from molten material and that a number of additions, modifications, and variations of the illustrated structure are contemplated by the present disclosure, several examples of which shall now be described.

Slinger basket 30 is one example of a slinger basket including a base extending radially outward from a central drive aperture structured to receive a rotary drive shaft, a side wall extending axially upward from the base and including a plurality of distribution holes defined therein, and an upper flange extending from the annular side wall and to an upper basket opening spanning the base The bottom wall 33 of slinger basket 30 is one example of a base member extending radially outward from a central drive aperture structured to receive a rotary drive shaft. In the illustrated form, bottom wall 33 is radially tapered from a first thickness at an inner radial position to a second thickness less than the first thickness at a radially outer position. In the illustrated form, the upper surface of bottom wall 33 includes a portion with a downward slope in the radially outward direction. In other forms, a central drive aperture may be of different shapes or dimensions, and a base member may extend radially outward over a greater or lesser distance, may have a different shape relative to the illustrated embodiments, and may extend at a different angle or angles relative to those of the illustrated embodiments The side wall 32 of slinger basket 30 is one example of an annular side wall extending axially upward from a base and including a plurality of distribution holes defined therein. In other forms, a different number and pattern of distribution holes may be utilized, an annular side wall may extend axially upward from a different location and at different orientations relative to a base or relative to other structures of a slinger basket or spinner body, and an annular side wall may extend axially upward over a greater or lesser height, may have a different shape relative to the illustrated embodiments, and may extend at a different angle or angles relative to those of the illustrated embodiments.

The top wall 31 of slinger basket 30 is one example of an upper flange extending radially inward from an upper portion of the basket side wall to delimit an upper basket opening spanning the base. In other forms, an upper flange may extend radially inward from different locations and at different orientations relative to a basket side wall or relative to other structures of a slinger basket or spinner body, and an upper flange may extend radially inward over a greater or lesser distance, may have a different shape relative to the illustrated embodiments, and may extend at a different angle or angles relative to those of the illustrated embodiments.

The spinner body 20 is one example of a spinner body including a roof positioned above the upper flange and extending radially outward from the upper basket opening, a spinner side wall extending axially downward from the roof and including a plurality of fiberizing holes defined therein, and a lower flange extending radially inward from the spinner side wall to a lower spinner opening.

The top wall 21 of spinner body 20 is one example of a roof member which extends radially outward from an upper basket opening. In other forms, a roof member may extend radially outward from different locations and at different orientations relative to a slinger basket or other structures of a spinner body or slinger basket, and a roof member may extend radially outward over a greater or lesser distance, may have a different shape relative to the illustrated embodiments, and may extend at a different angle or angles relative to those of the illustrated embodiments.

The peripheral side wall 22 of spinner body 20 is one example of an annular spinner side wall extending axially downward from a roof and including a plurality of fiberizing holes defined therein. In other forms, an annular spinner side wall may extend axially downward from different locations and at different orientations relative to other structures of a spinner body or slinger basket, and an annular spinner side wall may extend radially outward over a greater or lesser distance, may have a different shape relative to the illustrated embodiments, and may extend at a different angle or angles relative to those of the illustrated embodiments.

The bottom wall 23 of spinner body 20 is one example of a lower flange extending radially inward from a lower portion of a spinner side wall to delimit a lower spinner opening extending to a basket. In other forms, a lower flange may extend radially inward from different locations and at different orientations relative to other structures of a spinner body or slinger basket, and a lower flange may extend radially inward over a greater or lesser distance, may have a different shape relative to the illustrated embodiments, and may extend at a different angle or angles relative to those of the illustrated embodiments.

Retaining ring 40 is one example of a retaining member that is positioned above a roof and that receives a plurality of fasteners extending through holes in the retaining ring, the roof and an upper flange to retain the slinger basket and the spinner body together. In other forms, a retaining member may extend radially from different locations and at different orientations relative to other structures of a spinner body or slinger basket, may include multiple pieces, and a retaining member may extend over a greater or lesser distance, may have a different shape relative to the illustrated embodiments, and may extend at a different angle or angles relative to those of the illustrated embodiments.

Figure 2:
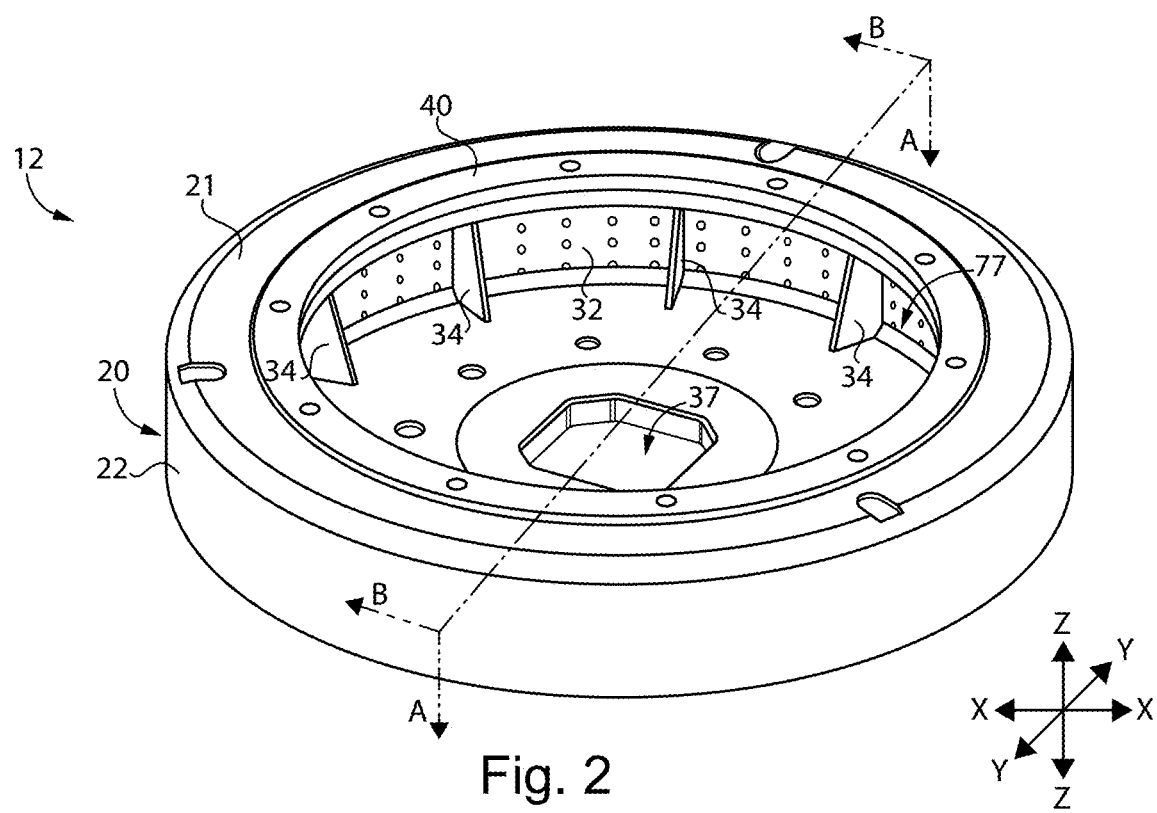
FIG. 2 is a perspective view of a spinner according to a second example embodiment.
Figure 2A:
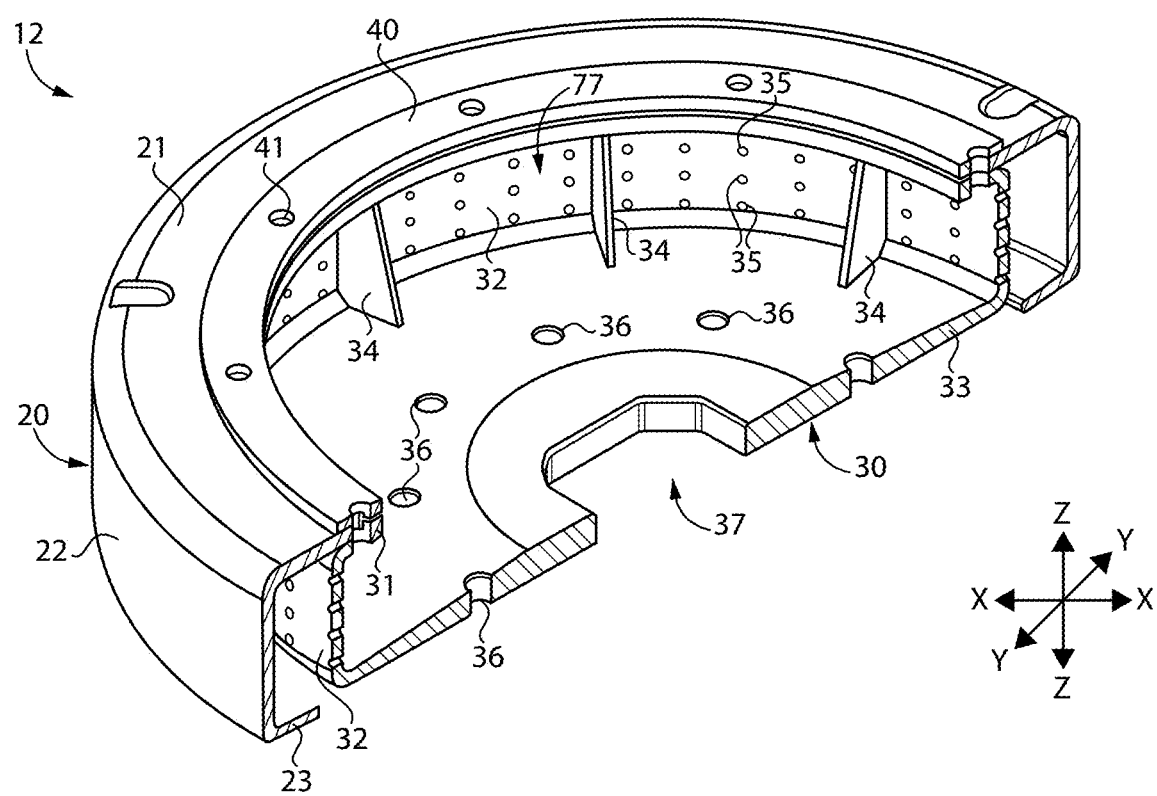
FIG. 2A is a perspective sectional view of the spinner according to the second example embodiment taken along arrow AA-AA of FIG. 2.
Figure 2B:
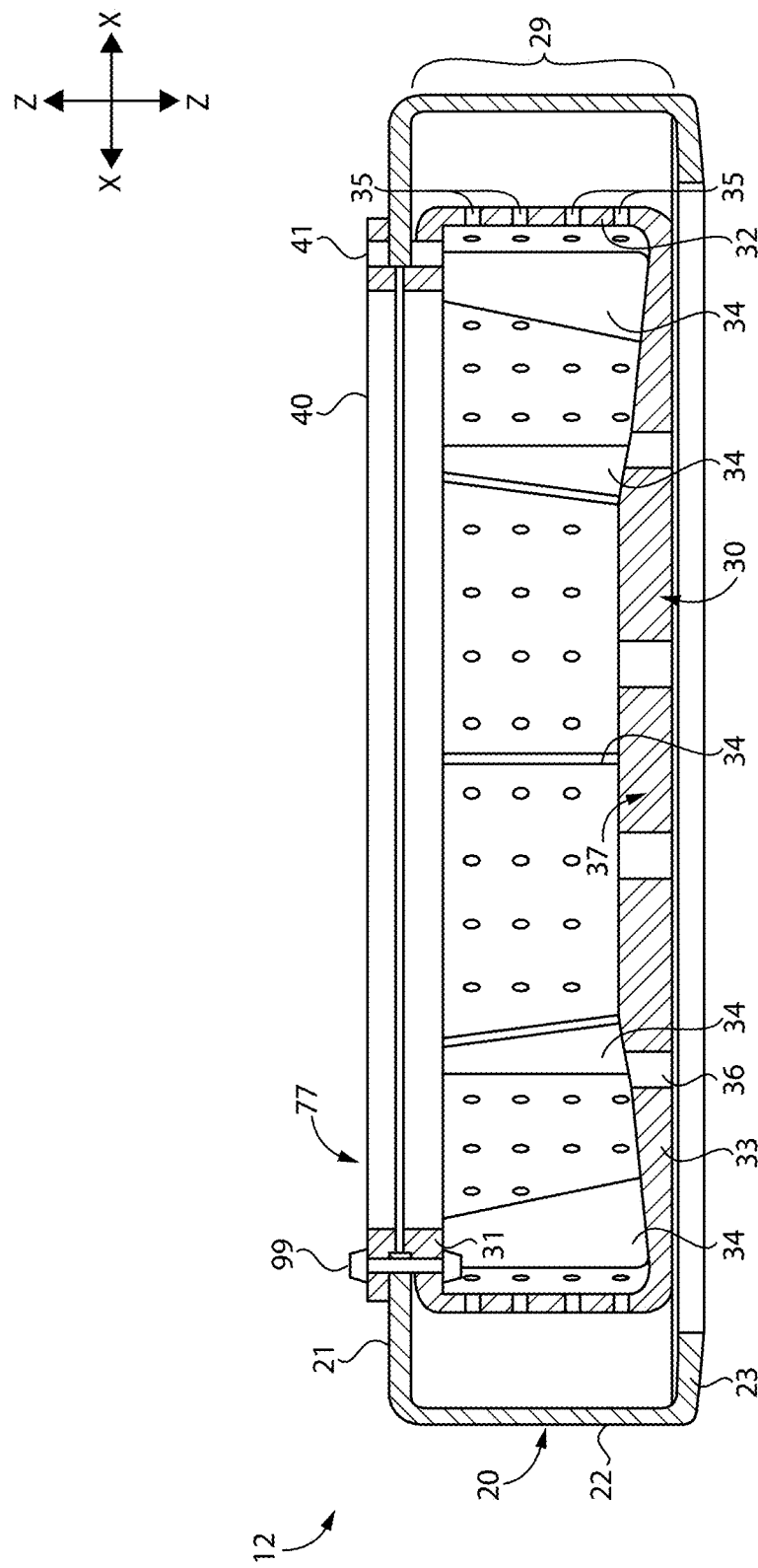
FIG. 2B is a side sectional view of the spinner according to the second example embodiment taken along arrow BB-BB of FIG. 2.

With reference to FIGS. 2, 2A and 2B there are illustrated perspective, perspective sectional, and side sectional views, respectively, of a spinner 12 according to a second example embodiment. Spinner 12 includes a number of features that are the same as, similar to or otherwise correspond to the features of spinner 11 illustrated and described in connection with FIGS. 1, 1A, and 1B which are indicated with like reference numerals and it shall be appreciated that the above description of these features, and the modifications and variations thereof, applies to the present embodiment. Spinner 12 also varies from spinner 11 in certain respects. For example, the plurality of gussets 24 illustrated and described in connection with spinner 11 are absent from spinner 12. Accordingly, in spinner 12, the inner surfaces of the spinner body 20 that comprise the inner surfaces of top wall 21, a peripheral side wall 22 and a bottom wall 23 do not include gusset structures. It shall be appreciated that the additions, modifications, and variations described above in connection with FIGS. 1, 1A, and 1B may also apply, mutatis mutandis, to the features of the embodiment illustrated in FIGS. 2, 2A, and 2B.

Figure 3:
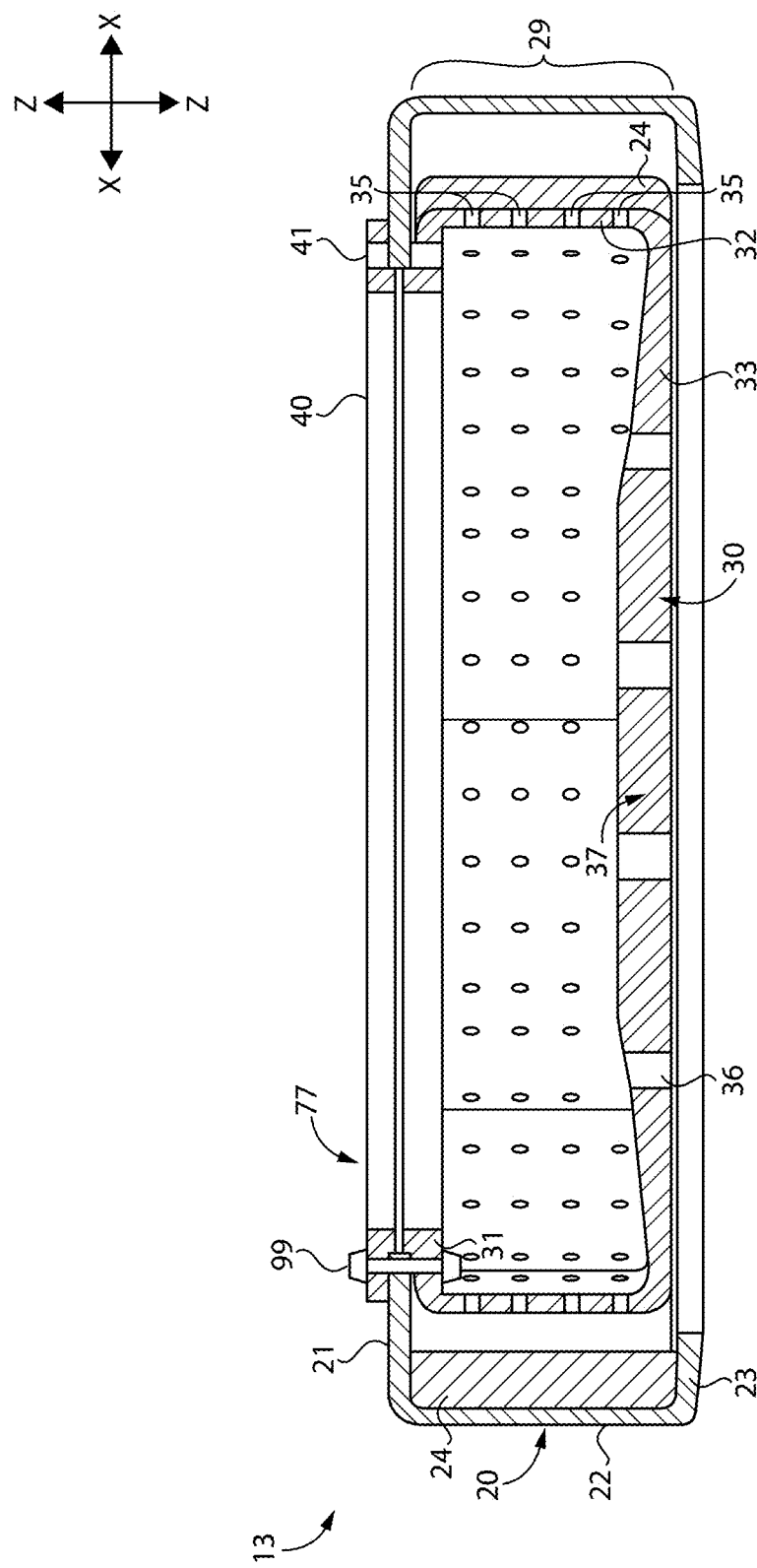
FIG. 3 is a side sectional view of a spinner according to a third example embodiment.

With reference to FIG. 3 there is illustrated a side sectional view of a spinner 13 according to a third example embodiment. Spinner 13 includes a number of features that are the same as, similar to or otherwise correspond to spinner 11 illustrated and described in connection with FIGS. 1, 1A, and 1B which are indicated with like reference numerals and it shall be appreciated that the above description of these features, and the modifications and variations thereof, applies to the present embodiment. Spinner 13 also varies from spinner 11 in certain respects. For example, the plurality of gussets 34 illustrated and described in connection with spinner 11 are absent from spinner 13. Accordingly, in spinner 13, the inner surfaces of the slinger basket 30 that comprise the inner surfaces of top wall 31, a peripheral side wall 32 and a bottom wall 33 and do not include gusset structures. It shall be appreciated that the additions, modifications, and variations described above in connection with FIGS. 1, 1A, and 1B may also apply, mutatis mutandis, to the features of the embodiment illustrated in FIG. 3.

Figure 4:
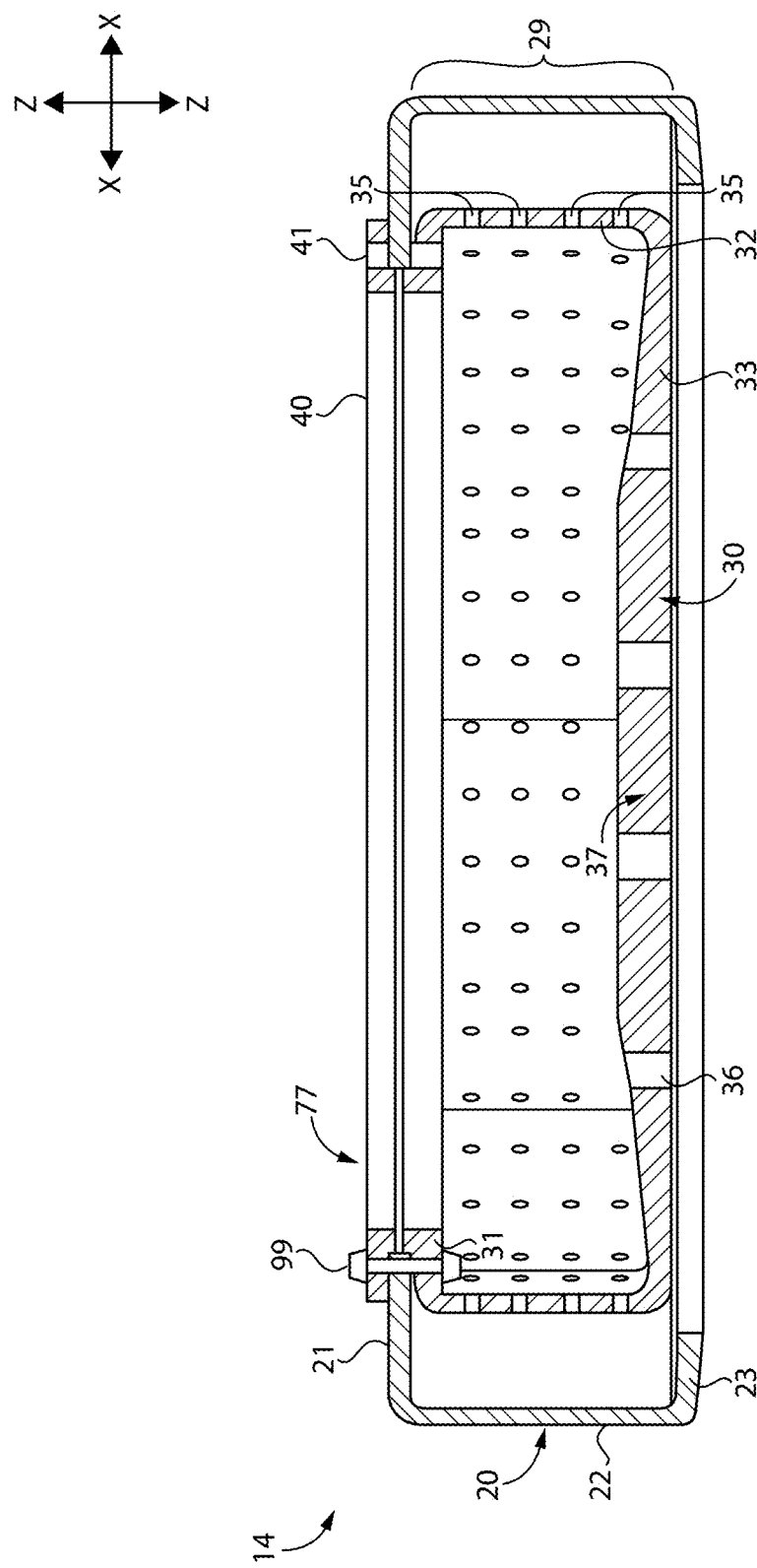
FIG. 4 is a side sectional view of a spinner according to a fourth example embodiment.

With reference to FIG. 4, there is illustrated a side sectional view of a spinner 14 according to a fourth example embodiment. Spinner 14 includes a number of features that are the same as, similar to or otherwise correspond to spinner 11 illustrated and described in connection with FIGS. 1, 1A, and 1B which are indicated with like reference numerals and it shall be appreciated that the above description of these features, and the modifications and variations thereof, applies to the present embodiment. Spinner 14 also varies from spinner 11 in certain respects. For example, the plurality of gussets 34 illustrated and described in connection with spinner 11 are absent from spinner 14. Accordingly, in the spinner 14, the inner surfaces of the slinger basket 30 that comprise the inner surfaces of top wall 31, a peripheral side wall 32 and a bottom wall 33 do not include gusset structures. Additionally, the plurality of gussets 24 illustrated and described in connection spinner 11 are absent from the form of spinner 14. Accordingly, in spinner 14, the inner surfaces of the spinner body 20 that comprise the inner surfaces of top wall 21, a peripheral side wall 22 and a bottom wall 23 do not include gusset structures. It shall be appreciated that the additions, modifications, and variations described above in connection with FIGS. 1, 1A, and 1B may also apply, mutatis mutandis, to the features of the embodiment illustrated in FIG. 4.

In each of the forms described above, the spinner 11 may be used in a fiberizing process to produce glass fibers. In this process the spinner 11 is rotated about its central axis and molten glass is poured into the slinger basket 30 at a location between the vent holes 36 and the interior side wall 32 of the slinger basket 30. A centrally positioned burner may be used to direct hot gasses into the slinger basket 30 to maintain a desired temperature, although the burner may alternatively be omitted, in which case the vent holes 36 could also be omitted. The molten glass flows to the interior side wall 32 and passes through the distribution holes 35 in continuous streams of molten glass. The streams of molten glass provided to the interior surface of the peripheral side wall 22 of the spinner body 20 then flow out of the fiberizing holes formed therein. Fibers of glass exit the exterior surface of the peripheral side wall 22 and are further attenuated by a flow of hot gas.

Figure 5:
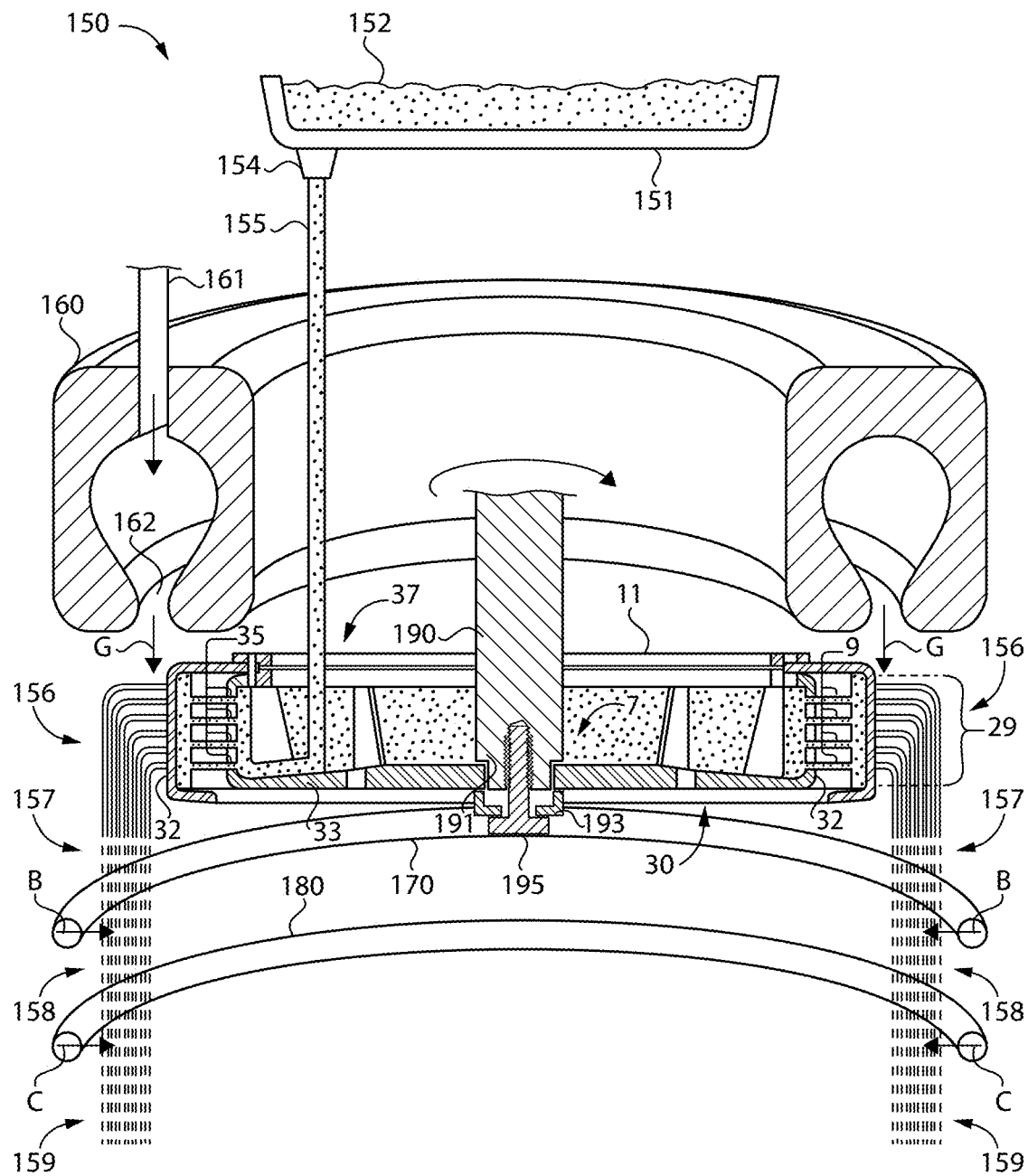
FIG. 5 is a partially sectional view of a fiber production system including the spinner of FIG. 1.

With reference to FIG. 5, there is illustrated an example system 150 for producing fibers from molten material. System 150 includes a spinner which, in the illustrated form is spinner 11, but in other forms may be any of spinner 11, spinner 12, spinner 13, and spinner 14 described above or a spinner with further additions, modifications, and variations on those embodiments described above and that the following description applies to each of those spinners, mutatis mutandis. Spinner 11 is coupled with a drive shaft 190 at joint 7. In the illustrated embodiment, spinner 11 is coupled with drive shaft 190 by fastening bolt 195, fastening washer 193, and shaft shoulder 191. In particular, fastening bolt 195 is in threaded engagement with a lower axial portion of drive shaft 190 to apply a clamping force to fastening washer 193 and spinner 11 is clamped between fastening washer 193 and shaft shoulder 191. In other embodiments spinner 11 may be coupled with drive shaft 190 by a plurality of fastening bolts which pass through apertures in spinner 11, apertures in a retaining member positioned on one side of spinner 11 and apertures of a flange portion of drive shaft 190 positioned on the other side of spinner 11 effective to clamp spinner 11 between the flange portion and the retaining member. It shall be appreciated that a variety of other coupling structures may be utilized to couple spinner 11 with drive shaft 190 including, for example, alternate fastener arrangements, threaded connectors, spline connectors and other types of coupling structures.

System 150 further includes a furnace 151 containing a supply of molten thermoplastic material 152. It shall be appreciated that a variety of molten thermoplastic materials may be utilized including for example glass, rock, other mineral compositions such as slags and basaltic materials, or mixtures thereof. A dispensing device 154 is connected to furnace 151 and dispenses a flow of molten material 155 to spinner 11. System 150 is structured such that the flow of molten material 155 is directed to a location in the central opening 37 of spinner 11 which is radially outward from the drive shaft 190 and radially inward of the structure of any gussets provided in the slinger basket. In this configuration, the flow of molten material 155, is advantageously not introduced through a hollow rotating shaft and drive shaft 190 may be a solid shaft. As spinner 11 is rotated by drive shaft 190 centrifugal force acts on molten material 155 and forces it outward toward the side wall of spinner 11 and through a plurality of apertures formed in a side wall of spinner 11. The rate of rotation of shaft 190 and spinner 11 may be varied and controlled.

During operation, spinner 11 is rotated and the flow of molten material 150 introduced into the slinger basket of spinner 11 travels along the upper surface of its bottom wall 33 to its interior side wall 32, and vertically up the interior side wall 32. The flow of molten material 150 is discharged from the slinger as a plurality of streams 9 flowing radially outward through each row of distribution holes 35. In accordance with the distribution hole features of spinners 11, 12, 13, and 14, the slinger basket 30 includes four rows of distribution holes 35 which provide four corresponding streams 9 of the flow of molten material 150. The streams 9 of the flow of molten material 150 discharged from the distribution holes 35 are directed onto and initially distributed across substantially all of the region 29 in which fiberizing holes are located in the spinner 20 which surrounds the slinger basket 30 and a substantially uniform amount of molten material is provided along the height of region 29. It shall therefore be appreciated that system 150 is one example of a system including a slinger basket including a plurality of distribution holes wherein the plurality of distribution holes are positioned to direct the plurality of streams of molten material onto substantially all of the fiberizing region. Additionally, system 150 is one example of such a system wherein the plurality of distribution holes comprise four rows of distribution holes. Additionally, system 150 is one example of such a system wherein the plurality of distribution holes consist essentially of four rows of distribution holes.

System 150 further includes a plenum 160 which receives a mixture of air and gas to be combusted from a supply 161 and outputs elevated temperature gas at annular outlet 162, which together may be referred to as an external burner. Plenum 160 and annular outlet 162 are structured to direct a stream of elevated temperature gas proximate the outer periphery of spinner 11 generally in the direction indicated by arrows G. The flow rate of elevated temperature gas provided by this external burner arrangement may be varied by varying the pressure in plenum 160. The temperature of the elevated temperature gas provided by this external burner arrangement may be varied by controlling the amount of excess $O_2$ present in the gas mixture.

Molten material exits the side wall of spinner 11 as a plurality of pre-fibers 156 which encounter the stream of elevated temperature gas provided by plenum 160. The pre-fibers 156 are entrained in the gas stream and are further attenuated into fibers 157. Fibers 157 travel in a downward direction through annular feed ring 170 which introduces a cooling material into the gas stream as generally indicated by arrows B to provide cooled fibers 158 entrained in the gas stream. The cooled fibers 158 travels in a downward direction through annular feed ring 180 which introduces a binder material into the gas stream as generally indicated by arrows C to provide a fiber/binder mixture 159 entrained in the gas stream. The fiber/binder mixture 159 continues to travel in the downward direction where it is collected and may be further processed for forming fiber-based materials such as fiberglass, rock wool, or mineral wool materials and structures composed thereof.

During operation of system 150, the spinner 11 may experience substantial thermal stress. In certain embodiments, the high-temperature portions of the spinner 11 may be at least 2000 degrees F. In certain embodiments used in connection with molten glass the high-temperature portions of the spinner 11 may range from 1700 degrees F. to 2100 degrees F. or various points therebetween. In certain embodiments used in connection with molten slag or molten basaltics, the high-temperature portions of the spinner 11 may range from 2000 degrees F. to 2300 degrees F. or various points therebetween. In certain embodiments used in connection with molten rock compositions, the high-temperature portions of the spinner 11 may range from 2100 degrees F. to 2400 degrees F. or various points therebetween. Such high temperature portions may be present in the side wall of the spinner 11 and in particular, though not exclusively, at or near the intersection of the side wall and the lower wall, or at or near the intersection of the side wall and the upper wall or flange proximate the stream of elevated temperature gas directed from the plenum 160. The thermal gradient experienced by the spinner 11 may also be substantial. In certain embodiments, the low-temperature portions of the spinner 11 may range from 800 degrees F. to 900 degrees F. or various points therebetween. These low temperatures portions may be present in the lower wall or base of spinner 11 in particular, though not exclusively adjacent the coupling with shaft 190. The thermal gradient experienced by the spinner may range from any of the temperatures of the aforementioned high-temperature portions to any of the temperatures of the aforementioned low-temperature portions. It shall be appreciated that the example temperatures and ranges disclosed herein are non-limiting examples of the thermal conditions which may be experienced by spinner 11. A variety of other temperature conditions may also be experienced, including higher temperatures, lower temperatures, larger temperature gradients, and smaller temperature gradients.

Without wishing to be being bound by theory, it is believed that the illustrative embodiments disclosed herein provide a number of unique benefits and unanticipated and unconventional results. In one aspect, the operational deformation and degradation of the spinner bodies disclosed herein are mitigated by the fact that molten material dropped into the upper basket opening flows through the distribution holes as a plurality of streams spanning the lower spinner opening to the annular spinner side wall. This increases the operational lifespan of the spinner. In another aspect, the introduction of molten material into an upper roof-type spinner is simplified by providing an upper basket opening and eliminating any need to introduce molten material through a rotating hollow shaft. In a further aspect, the amount of thermal and/or rotational energy needed to produce a given fiber type and quality may be reduced. For example, it was observed that comparable fiber quality is achieved with a conventional spinner can be achieved with a slower rotational speed, a lower external burner flow, a cooler external burner temperature (achieved, e.g., by higher excess 02 in external burner combustion), a cooler molten material temperature and/or elimination of a central burner. In one experiment a slower spinner speed (1800 rpm vs. 2200 rpm standard) and cooler burner flame (7.5% excess 02 vs. 6.0% excess 02 standard). In another aspect, the mass or weight of the spinner is reduced relative to certain conventional spinners by providing a roof that extends only from a centrally positioned upper opening to a slinger basket to side wall of a spinner body effective to provide a reduced roof mass or weight for a given spinner diameter, and/or providing a roof that extends substantially perpendicular to the axis of the drive shaft effective to provide reduced roof mass or weight for a given radial roof span. In a further aspect, temperature gradient or temperature variation in the spinner body during operation of the spinner is reduced relative to conventional spinners by providing a roof that extends only from a centrally positioned upper opening to a slinger basket to side wall of a spinner body and/or providing a roof that extends substantially perpendicular to the axis of the drive shaft effective to mitigate stresses that result from larger thermal gradients.

Figure 6:
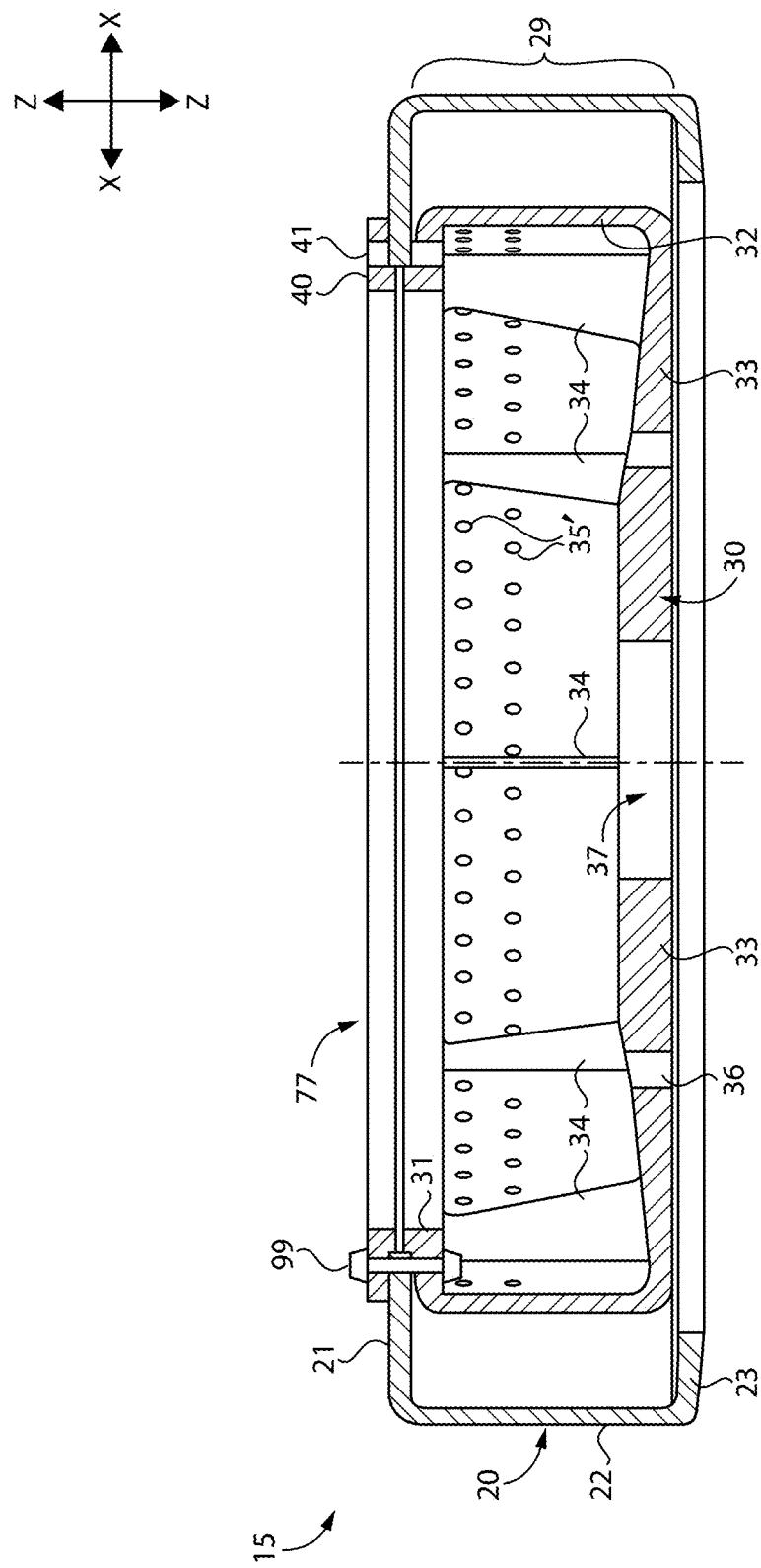
FIG. 6 is a side sectional view of a spinner according to a fifth example embodiment.

With reference to FIG. 6, there is illustrated a side sectional view of a spinner 15 according to a fifth example embodiment. Spinner 15 includes a number of features that are the same as, similar to or otherwise correspond to spinner 11 illustrated and described in connection with FIGS. 1, 1A, and 1B which are indicated with like reference numerals and it shall be appreciated that the above description of these features, and the modifications and variations thereof, applies to the present embodiment. Spinner 15 also varies from spinner 11 in certain respects.

In one respect, the distribution holes 35' provided in slinger basket 30 of spinner 15, are configured in two rows which are offset or staggered relative to one another. The two rows of distribution holes 35' are positioned within substantially the upper 50% of the height of slinger basket 30. This positioning of distribution holes 35' is such that during operation, molten material introduced into slinger basket 30 travels along the upper surface of bottom wall 33 to interior side wall 32, vertically up interior side wall 32, and is discharged from slinger basket 30 as streams flowing radially outward through each row of distribution holes 35'. The streams of molten material discharged from distribution holes 35' are directed onto and initially distributed to substantially the upper 50% of fiberizing region 29 in which fiberizing holes are located and subsequently flow to the entire fiberizing region 29. Thus, during operation, a substantially non-uniform amount of molten material is provided along the height of fiberizing region 29 with the upper 50% of fiberizing region 29 being supplied with a greater amount of material.

It shall be appreciated that the total area of distribution holes, for example, distribution holes 35 or distribution holes 35', may be selected to be sufficient to vertically fill the periphery of the slinger basket without overflowing the slinger basket for a given mass flow rate of molten material and/or may be selected to be sufficient to vertically fill the periphery of the spinner body without overflowing the spinner body for a given mass flow rate of molten material. It shall be further appreciated that the illustrated arrangement of distribution holes 35' may be modified while continuing to meet one or both of these criteria. For example, the two rows of offset distribution holes 35' may be more tightly arranged such that streams of molten material discharged from distribution holes 35' are directed onto and initially distributed to substantially the upper 30% to 50% of fiberizing region 29. This may be accomplished by an arrangement of two offset rows of distribution holes that occupy a vertical length of 1.5 times to times the diameter of the holes.

Figure 30:
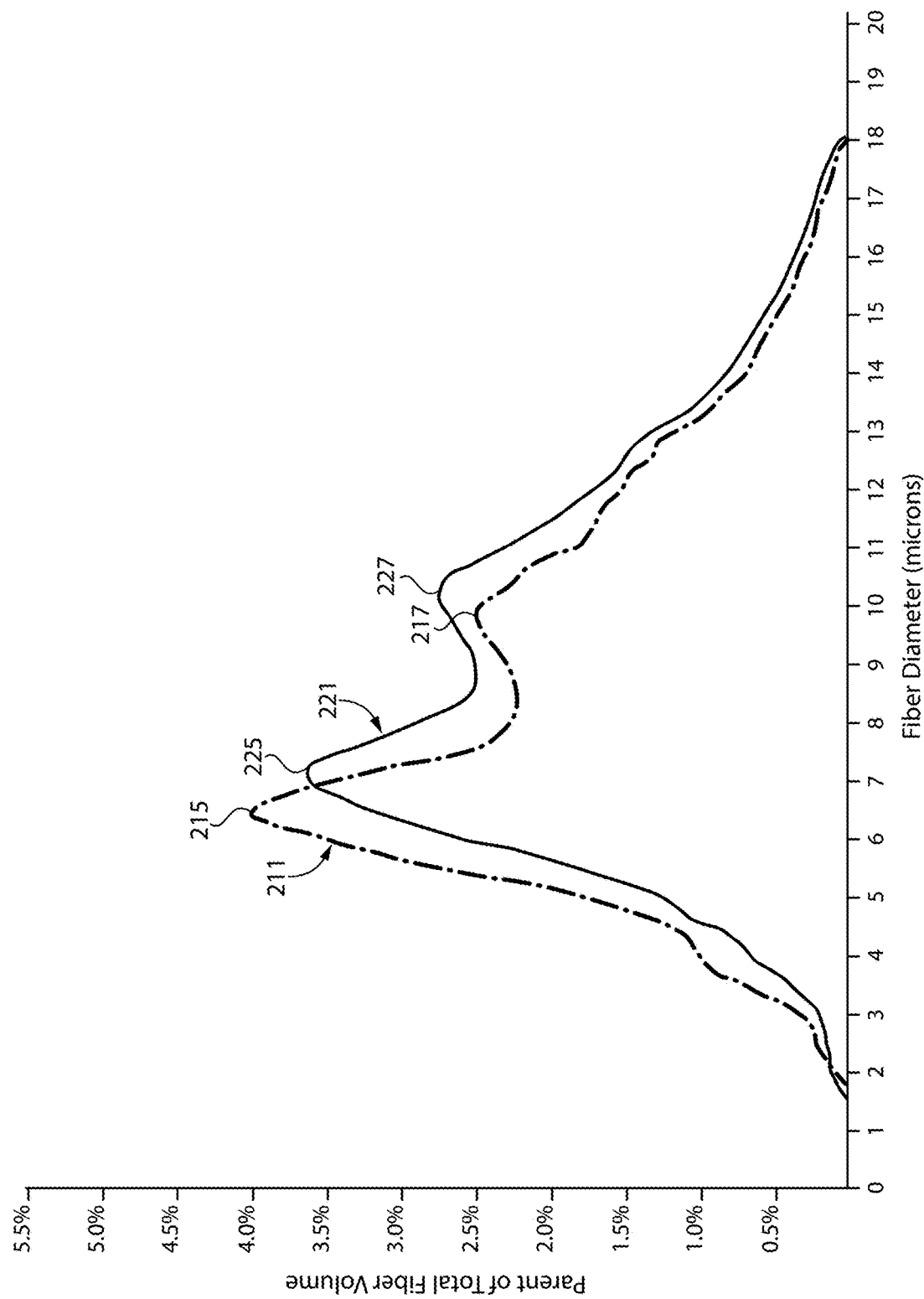
FIG. 30 is a graph illustrating a distribution of percent total fiber volume as a function of fiber diameter for fiber produced by two different spinners.

The non-uniform distribution of molten material provided along the height of fiberizing region 29 has been observed to provide advantages for certain applications. By way of example, the graph of FIG. 30 illustrates percent of total fiber volume as a function of fiber diameter for two different spinners. Curve 211 illustrates fiber produced by a spinner in accordance with spinner 15. Curve 221 illustrates fiber produced by a conventional spinner. Curve 211 was observed to have a maximum peak 215 which was greater in magnitude and at a lower fiber diameter than maximum peak 225 of curve 221. Curve 211 was also observed to have a secondary peak 217 which was lower in magnitude and at a lower fiber diameter than secondary peak 227 of curve 221. These differences indicate that the quality of fiber produced by a spinner in accordance with spinner 15 offers performance advantages for applications such as batt thermal insulation where a greater percentage of lower diameter fibers offers enhanced insulation performance and may be necessary to provide desired performance within a given product form factor. It is believed that the advantages may be attributable to an increase in the flow of molten material 150 provided to the upper portion of the region of fiberizing holes which may be subjected to higher temperatures than the lower portions.

In another respect, the plurality of gussets 24 illustrated and described in connection with spinner 11 are absent from spinner 15. Accordingly, in spinner 15, the inner surfaces of the spinner body 20 that comprise the inner surfaces of top wall 21, a peripheral side wall 22 and a bottom wall 23 do not include gusset structures. It shall be appreciated that the additions, modifications, and variations described above in connection with FIGS. 1, 1A, and 1B may also apply, mutatis mutandis, to the features of the embodiment illustrated in FIG. 6.

Figure 7:
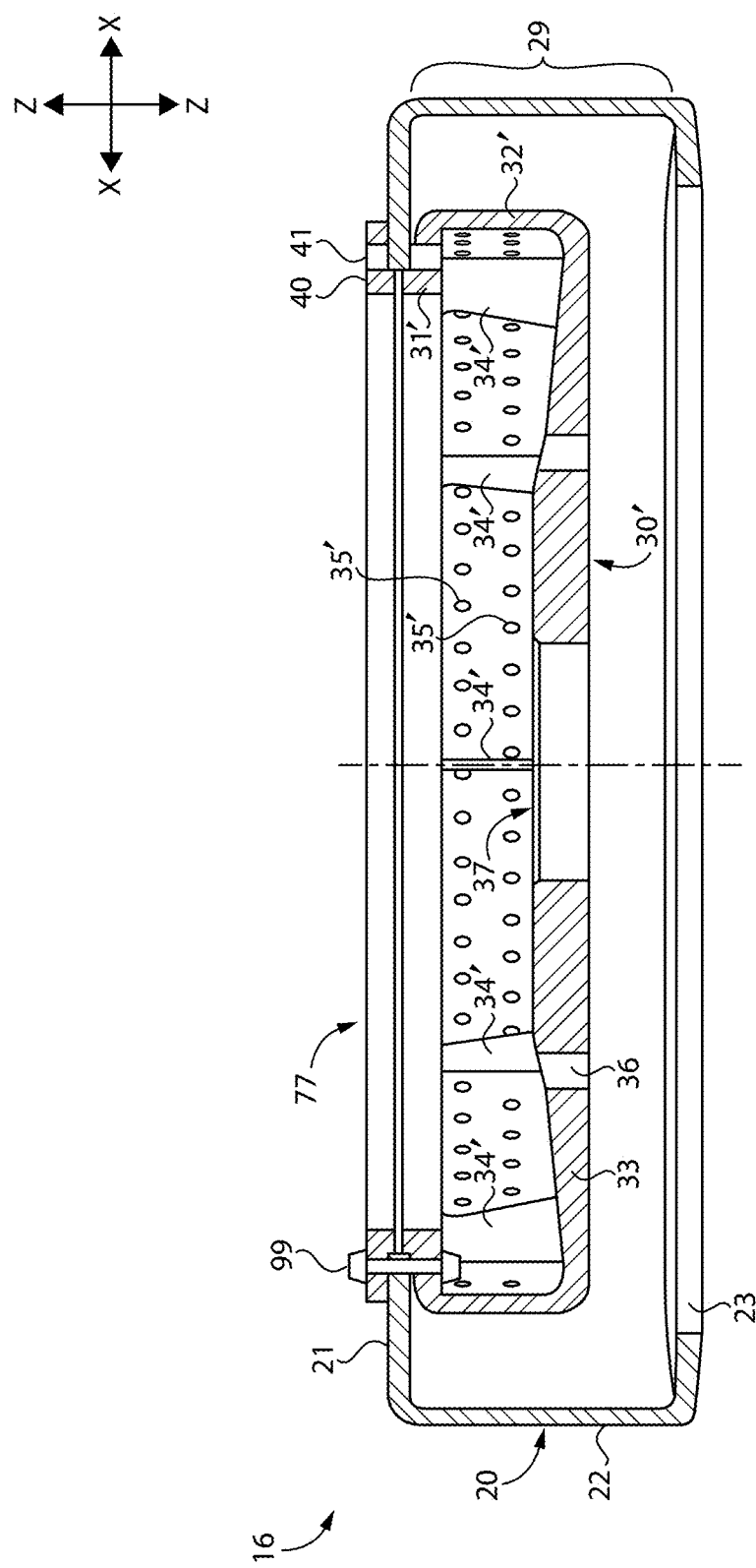
FIG. 7 is a side sectional view of a spinner according to a sixth example embodiment.

With reference to FIG. 7, there is illustrated a side sectional view of a spinner 16 according to a sixth example embodiment. Spinner 16 includes a number of features that are the same as, similar to or otherwise correspond to spinner 11 and spinner 15 which are indicated with like reference numerals and it shall be appreciated that the above description of these features, and the modifications and variations thereof, apply to the present embodiment. Spinner 16 also varies from spinner 11 and spinner 15 in certain respects.

In one respect, the slinger basket 30' of spinner 16 includes an interior side wall 32' which has a lesser vertical height than that of side wall 32 of slinger basket 30. Gussets 34' also have a corresponding lesser vertical height relative to gussets 34 of slinger basket 30. In the illustrated embodiment, the lesser vertical height of interior side wall 32' of slinger basket 30' is approximately 50% less than the vertical height of interior side wall 32 of slinger basket 30. The reduced vertical height of slinger basket 30' maintains the arrangement, characteristics, features, and positioning of distribution holes 35' relative to the other components of slinger 16. Similar to slinger 15, the positioning of distribution holes 35' is such that during operation, molten material introduced into slinger basket 30' travels along the upper surface of bottom wall 33 to interior side wall 32', vertically up interior side wall 32', and is discharged from slinger basket 30' as streams flowing radially outward through each row of distribution holes 35'. The streams of molten material discharged from distribution holes 35' are directed onto and initially distributed to substantially the upper 50% of fiberizing region 29 in which fiberizing holes are located and subsequently flow to the entire fiberizing region 29. Thus, during operation, a substantially non-uniform amount of molten material is provided along the height of fiberizing region 29 with the upper 50% of fiberizing region 29 being supplied with a greater amount of material. The non-uniform distribution of molten material provided along the height of fiberizing region 29 is expected to provide results and advantages similar to those of spinner 15 as illustrated and described in connection with FIGS. 6 and 30

In another respect, the plurality of gussets 24 illustrated and described in connection with spinner 11 are absent from spinner 16. Accordingly, in spinner 16, the inner surfaces of the spinner body 20 that comprise the inner surfaces of top wall 21, a peripheral side wall 22 and a bottom wall 23 do not include gusset structures. It shall be appreciated that the additions, modifications, and variations described above in connection with FIGS. 1, 1A, and 1B may also apply, mutatis mutandis, to the features of the embodiment illustrated in FIG. 7.

Figure 8:
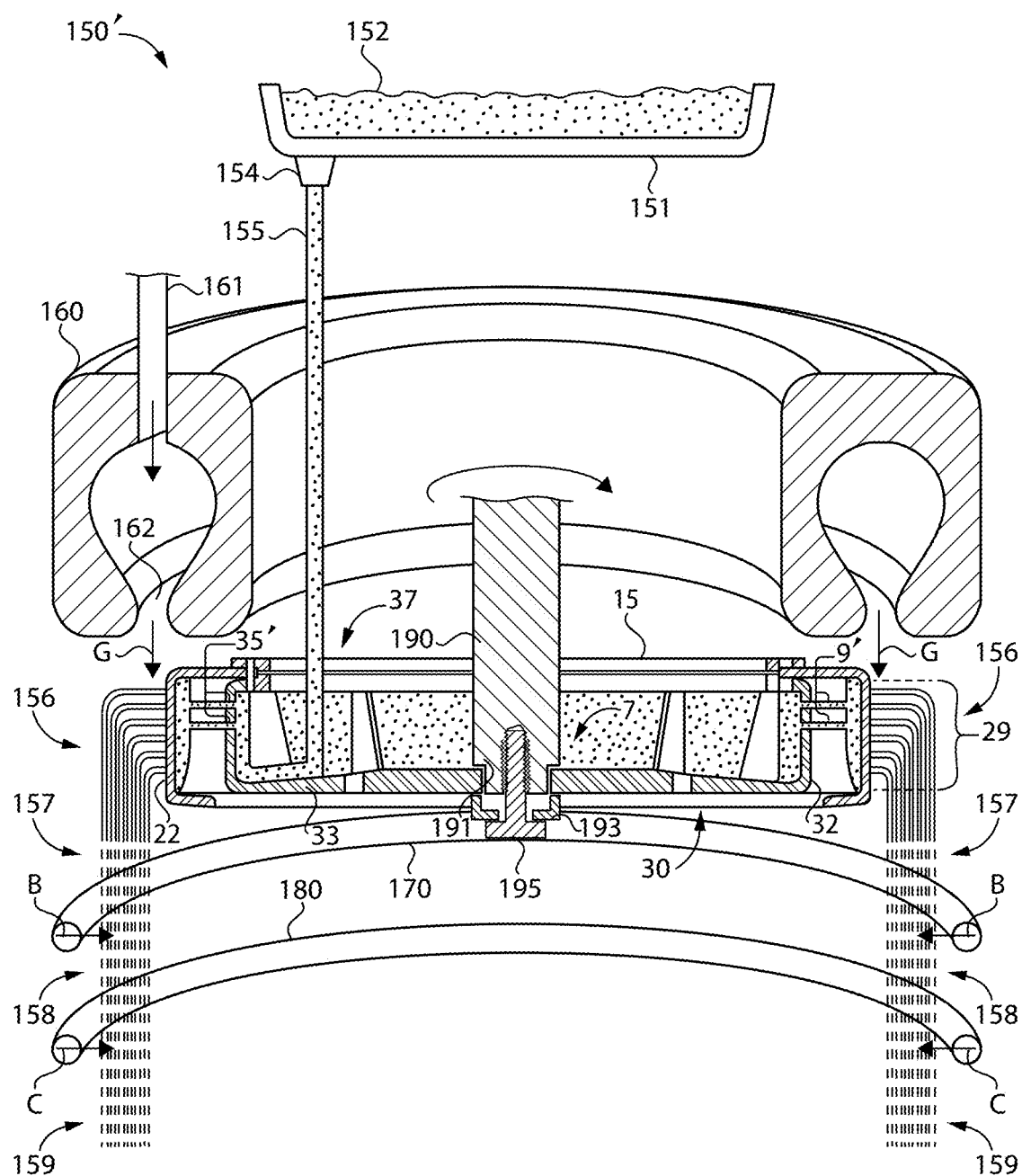
FIG. 8 is a partially sectional view of a fiber production system including the spinner of FIG. 6.
Figure 9:
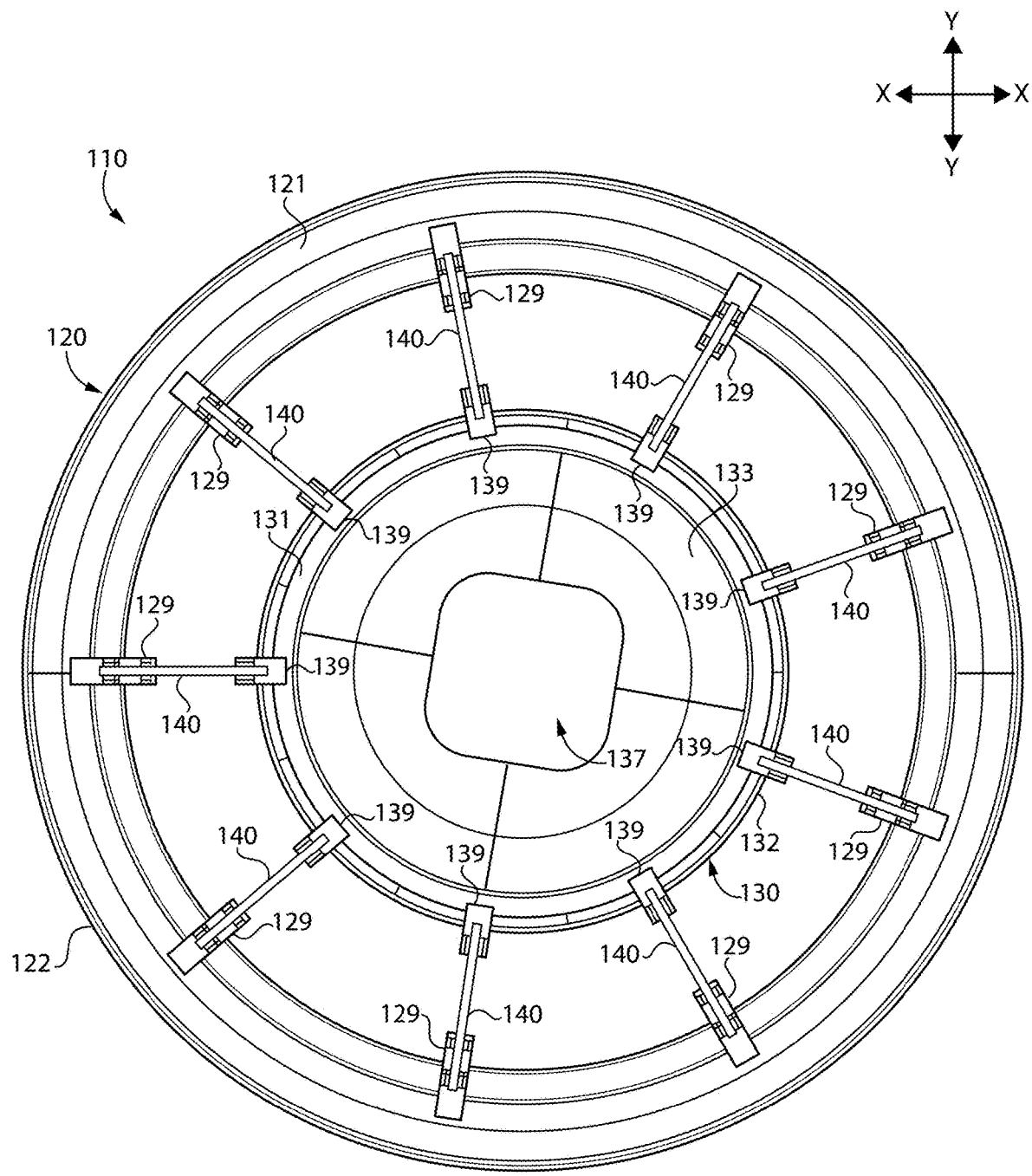
FIG. 9 is a top view of a spinner according to a seventh example embodiment.
Figure 10:
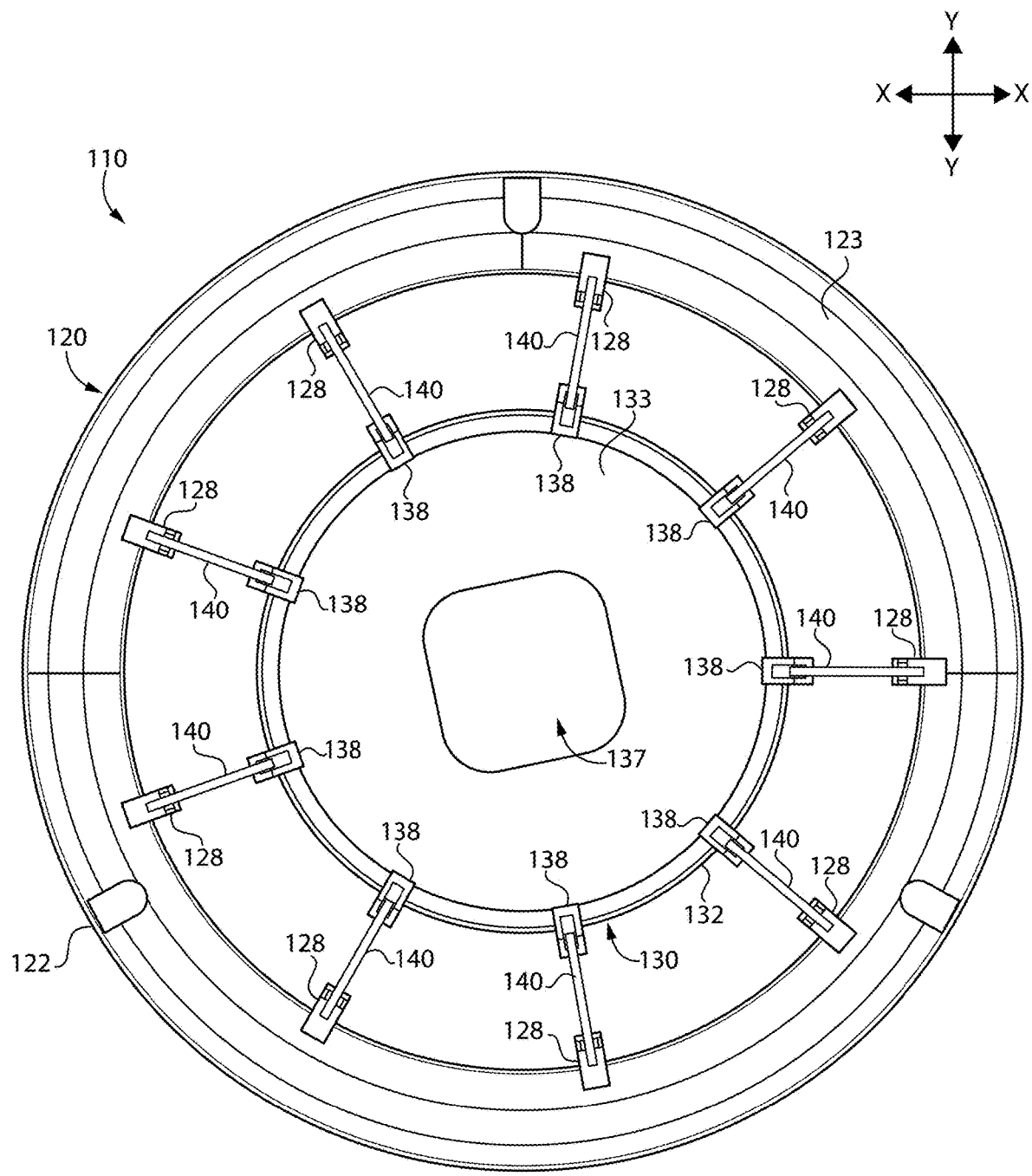
FIG. 10 is a bottom view of the spinner of FIG. 9.

With reference to FIG. 8, there is illustrated an example system 150' for producing fibers from molten material. System 150' includes a number of features that are the same as, similar to or otherwise correspond to system 150 illustrated and described in connection with FIG. 5 which are indicated with like reference numerals and it shall be appreciated that the above description of these features, and the modifications and variations thereof, apply to the present embodiment. System 150' also varies from system 150 in certain respects. For example, system 150' includes a spinner which, in the illustrated form is spinner 15, but in other forms may be spinner 15 or spinner 16 described above or a spinner with further additions, modifications, and variations on those embodiments described above and that the following description applies to each of those spinners, mutatis mutandis.

System 150' structured such that the flow of molten material 155 is directed to a location in the central opening 37 of spinner 15 which is radially outward from the drive shaft 190 and radially inward of the structure of any gussets provided in the slinger basket. In this configuration, the flow of molten material 155, is advantageously not introduced through a hollow rotating shaft and drive shaft 190 may be a solid shaft. As spinner 15 is rotated by drive shaft 190 centrifugal force acts on molten material 155 and forces it outward toward the side wall of spinner 15 and through a plurality of apertures formed in a side wall of spinner 15. The rate of rotation of shaft 190 and spinner 15 may be varied and controlled.

During operation, spinner 15 is rotated and the flow of molten material 150 introduced into the slinger basket of spinner 15 travels along the upper surface of its bottom wall 33 to its interior side wall 32, and vertically up the interior side wall 32. The flow of molten material 150 is discharged from the slinger as a plurality of streams 9' flowing radially outward through each row of distribution holes 35'. In accordance with the distribution hole features of spinners 15 and 16, the slinger basket 30 includes two rows of distribution holes 35' which provide two corresponding streams 9' of the flow of molten material 150. The streams 9' of the flow of molten material 150 discharged from the distribution holes 35' are directed onto and initially distributed across substantially the upper 50% or less of the region 29 in which fiberizing holes are located in the spinner 20 which surrounds the slinger basket 30 and a substantially non-uniform amount of molten material is provided along the height of region 29.

Accordingly, the functions, effect, and advantages described for spinners 15 and 16 and illustrated and described in connection with FIGS. 6, 7 and 30 are realized by system 150'. It shall therefore be appreciated that system 150' is one example of a system including a slinger basket including a plurality of distribution holes wherein the plurality of distribution holes are positioned to direct the plurality of streams of molten material onto only an axially upper portion of the fiberizing region. Additionally, system 150' is one example of such a system wherein the axially upper portion comprises an axially upper 50% or less of the fiberizing region. Additionally, system 150' is one example of such a system the plurality of distribution holes comprise two rows of distribution holes. Additionally, system 150' is one example of such a system wherein the plurality of distribution holes consist essentially of two rows of distribution holes.

It shall be appreciated that the embodiments illustrated and described in connection with FIGS. 1-8 are non-limiting examples of rotary spinners and systems including rotary spinners wherein a spinner body is not directly coupled with a drive shaft. Additionally, the embodiments illustrated and described in connection with FIGS. 1-8 are non-limiting examples of embodiment wherein a spinner body is directly coupled only with a slinger basket. Furthermore, the embodiments illustrated and described in connection with FIGS. 1-8 are non-limiting examples of embodiments wherein only a slinger basket is directly coupled with the drive shaft. In addition, the embodiments illustrated and described in connection with FIGS. 1-8 are non-limiting examples of embodiments wherein a slinger basket is directly coupled with a drive shaft by an upper retaining member, a lower retaining member, and a plurality of fasteners which clamp the slinger basket between the upper retaining member and the lower retaining member. Additionally, the embodiments illustrated and described in connection with FIGS. 1-8 are non-limiting examples of embodiment wherein the roof of the spinner body is substantially perpendicular to the axis of the drive shaft. Furthermore, the embodiments illustrated and described in connection with FIGS. 1-8 are non-limiting examples of embodiments wherein the upper flange is substantially parallel with the roof and an upper surface of the upper flange contacts a lower surface of the roof.

With reference to FIGS. 9, 10, 11, 12, 13 and 14 there are illustrated top, bottom, top perspective, partial perspective, bottom perspective and side views, respectively, of another example embodiment of a spinner 110 which includes a spinner body 120, a slinger basket 130 and a coupling spokes or struts 140 which are coupled together as an assembly. The spinner body 120 includes a top wall 121, a peripheral side wall 122 and a bottom wall 123. While not present in the embodiment of FIGS. 9-14, a plurality of gussets may be provided within the spinner body 120 and extend vertically between the top wall 121 and the bottom wall 123, and radially inward from the peripheral side wall 122. For example, gussets that are the same as, similar to or otherwise correspond to those illustrated and described above in connection with the embodiment of FIGS. 1, 1A, and 1B may be included as a component of spinner body 120. A plurality of rows of fiberizing holes are provided in the peripheral side wall 122 of spinner body 120. The fiberizing holes may be formed by laser drilling, electrical discharge milling (EDM), electron beam drilling or conventional drilling and are not depicted in the views of FIGS. 9-14.

The slinger basket 130 includes a top wall 131, an interior side wall 132 that is positioned between the center axis of the spinner 110 and the peripheral side wall 122 of the spinner body 120, a bottom wall 133 and an upper basket opening 177. In the assembled state, the top wall 121 of the spinner body 120 is substantially aligned with the top wall 131 of the slinger basket 130 in a vertical or Z-axis direction. In other forms, the top wall 121 of the spinner body 120 may be offset from the top wall 131 of the slinger basket 130. Furthermore, the bottom wall 123 of the spinner body 120 is substantially aligned with the bottom wall 133 of the slinger basket 130. In other forms, the bottom wall 123 of the spinner body 120 may be offset from the bottom wall 133 of the slinger basket 130 in a vertical or Z-axis direction. A central opening 137 is provided in the bottom wall 133 and is configured to receive a square drive member that rotates the spinner 110 during operation.

Figure 11:
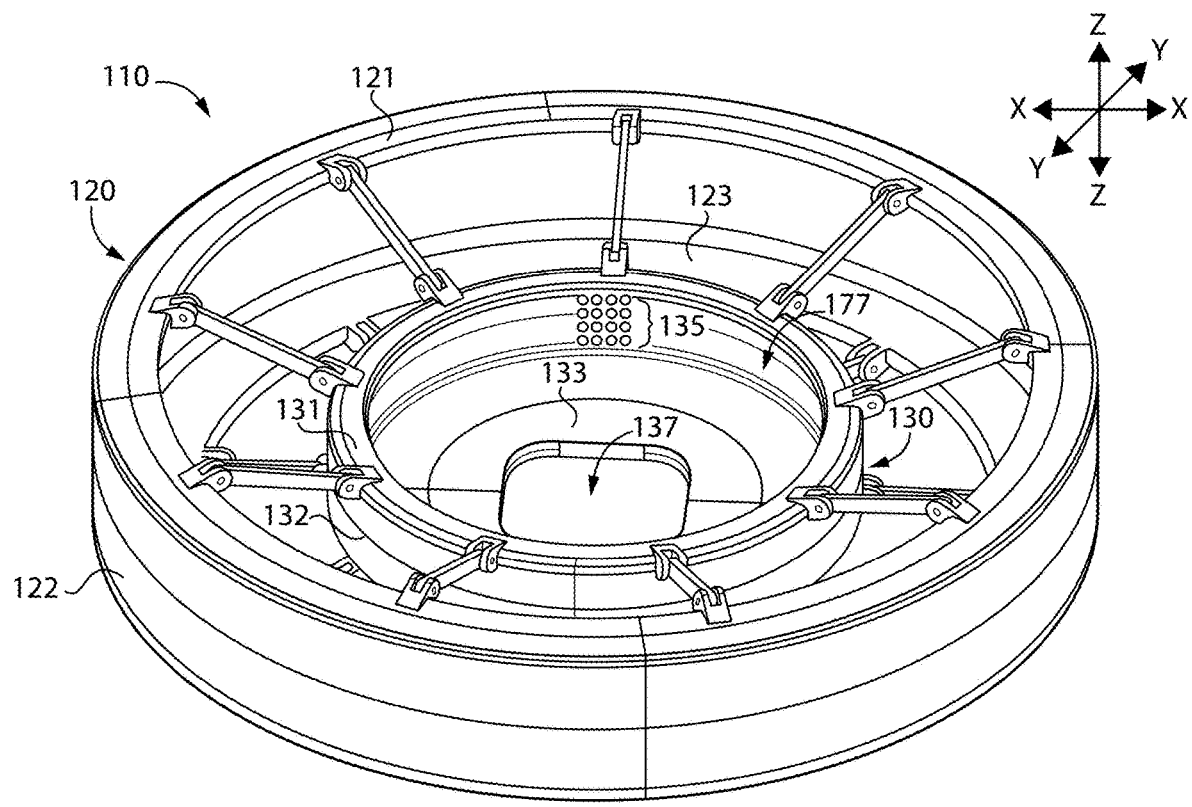
FIG. 11 is a top perspective view of the spinner of FIG. 9.
Figure 12:
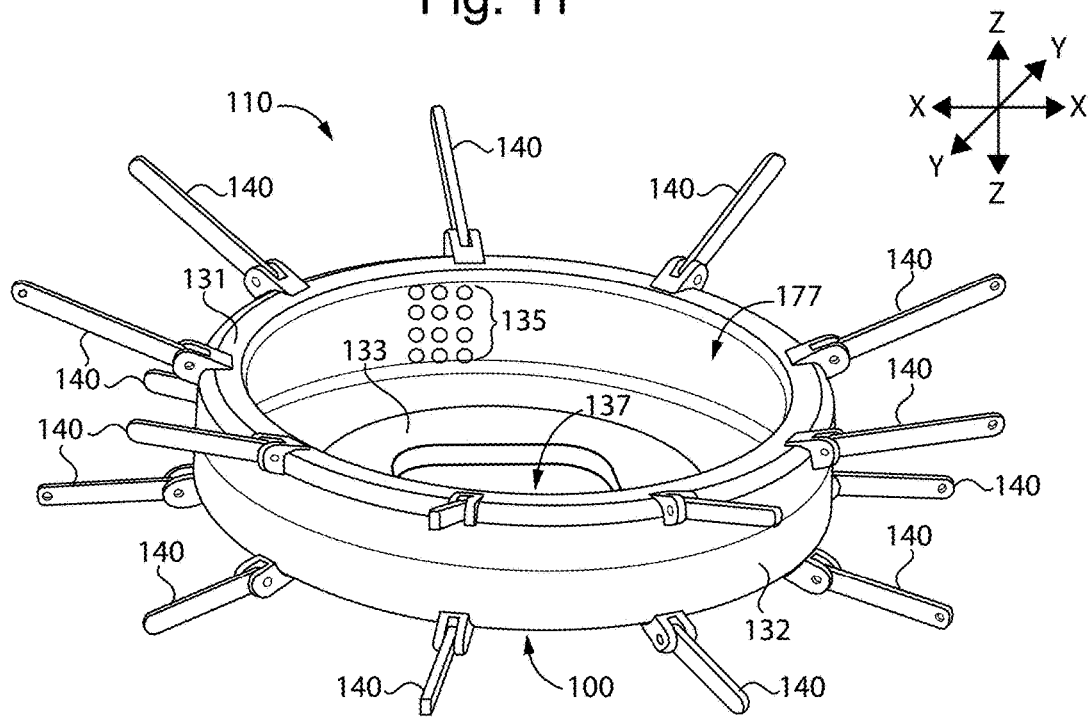
FIG. 12 is a partial top perspective view of certain components of the spinner of FIG. 9.
Figure 13:
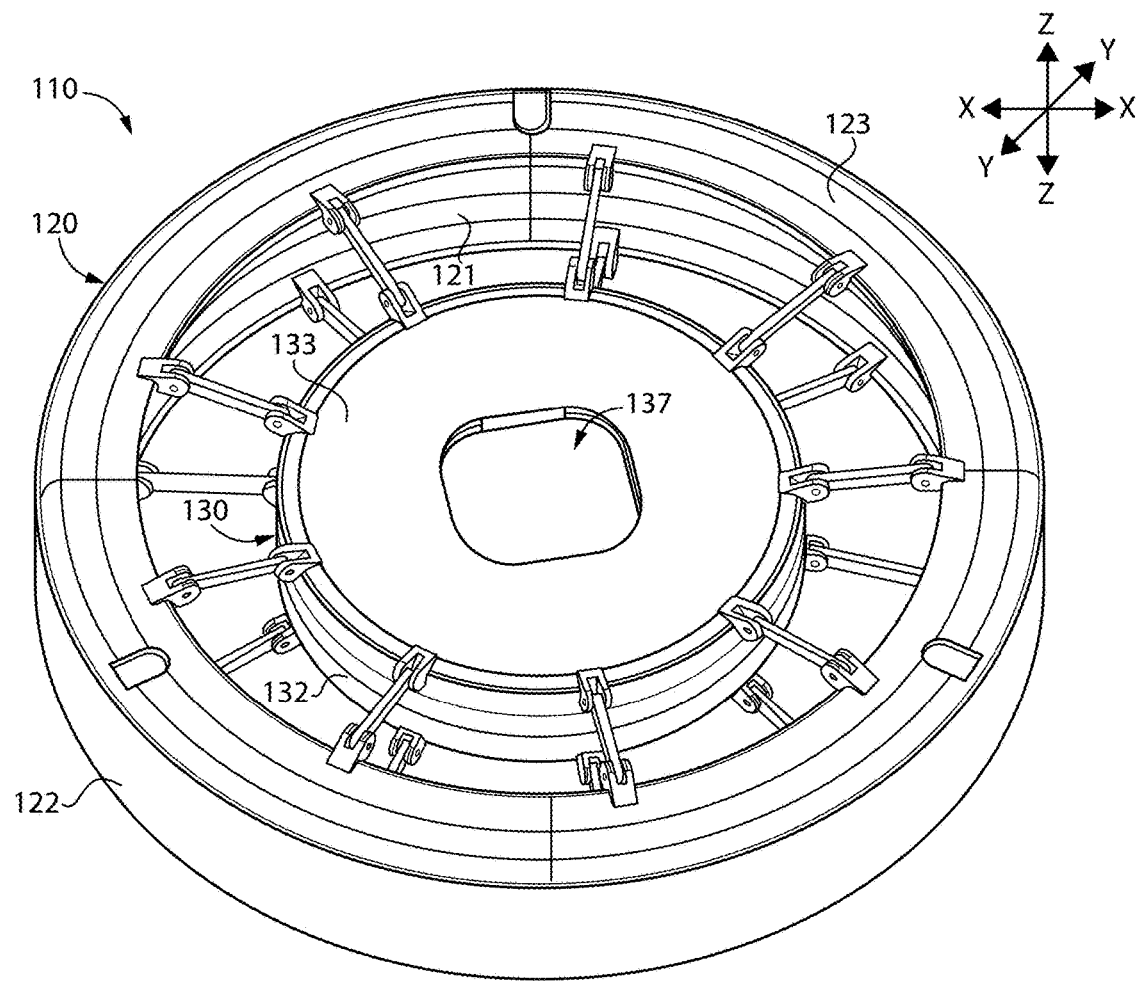
FIG. 13 is a bottom perspective view of certain components of the spinner of FIG. 9.
Figure 14:
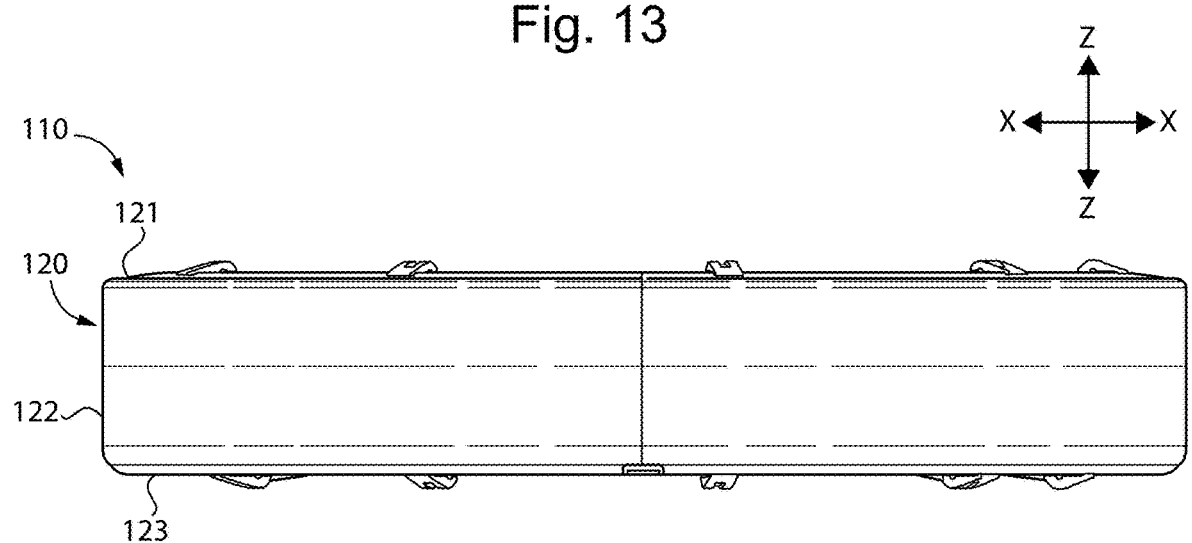
FIG. 14 is a side view of the spinner of FIG. 9.
Figure 20:
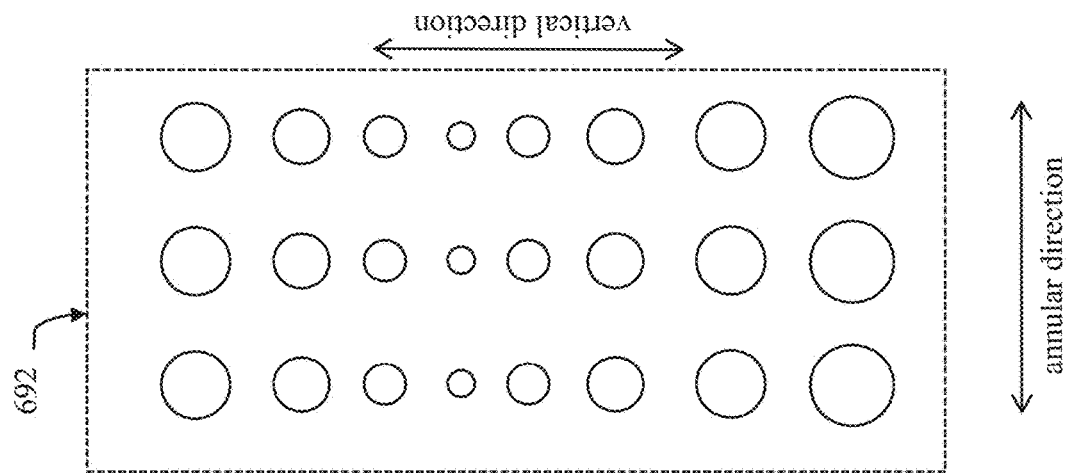
FIG. 20 is a schematic illustration of a sixth example fiberizing hole pattern.
Figure 19:
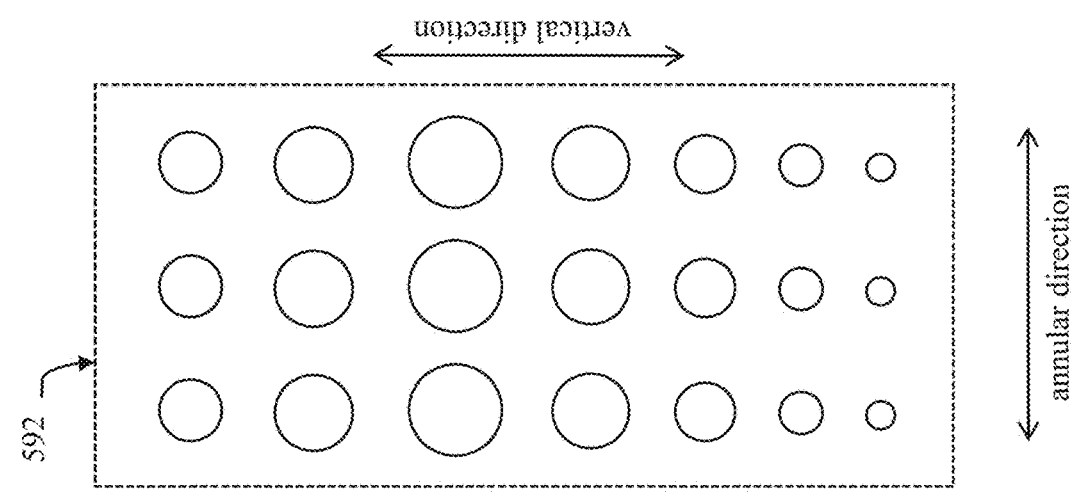
FIG. 19 is a schematic illustration of a fifth example fiberizing hole pattern.
Figure 18:
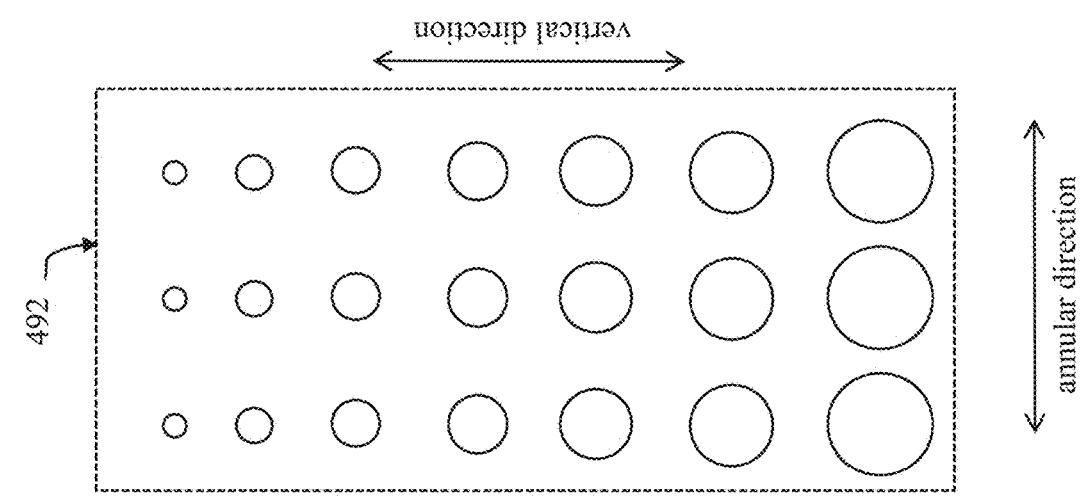
FIG. 18 is a schematic illustration of a fourth example fiberizing hole pattern.

As illustrated most clearly in FIGS. 11 and 12, the slinger basket 130 includes a plurality of distribution holes 135 provided in the interior side wall 132 of the slinger basket 130. While not present in the embodiment of FIGS. 9-14, a plurality of vent holes may be provided in the bottom wall 133 of the slinger basket 130. Such vent holes may be the same as, similar to or otherwise correspond to the vent holes 36 illustrated and described above in connection with FIGS. 1, 1A, and 1B. While not present in the embodiment of FIGS. 9-14, a plurality of gussets may be provided within the slinger basket 130 and extend vertically between the top wall 131 and the bottom wall 133, and radially inward from the interior side wall 132. Such gussets may be the same as, similar to or otherwise correspond to the gussets 34 illustrated and described above in connection with FIGS. 1, 1A, and 1B.

The distribution holes 135 are provided in a pattern including several annularly extending rows of distribution holes. The pattern of distribution holes is continuous and uninterrupted. In the illustrated form of spinner 110, the pattern of distribution holes is continuous and uninterrupted such that neither the gussets nor any other structure interrupts or interferes with any of the rows of distribution holes. In the illustrated form, the same may be true of any vent holes which are provided in the bottom wall 133 of the slinger basket 130. It is nevertheless contemplated that in other forms of spinner 110 the pattern of distribution holes may be interrupted by gussets or other reinforcing structures.

The spokes or struts 140 are coupled with the slinger basket 130 via a plurality of clevis joint type connections 139 wherein a hole formed in an end portion of each spoke or strut 140 is aligned with holes formed in the clevis joint features of the slinger basket 130 and a coupling pin is passed through the aligned holes to couple each spoke or strut 140 with the slinger basket 130. Various types of split pins, rings, caps, nuts or other retaining structures may be used to secure the coupling pin. One-piece, self-locking pins may also be utilized. It is also contemplated that other types of connections may be utilized, such as bolts, rivets or other types of connectors.

The spokes or struts 140 are coupled with the spinner body 120 via a plurality of clevis joint type connections 129 wherein a hole formed in an end portion of each spoke or strut 140 is aligned with holes formed in the clevis joint features of the spinner body 120 and a coupling pin is passed through the aligned holes to couple each spoke or strut 140 with the spinner body 120. Various types of split pins, rings, caps, nuts or other retaining structures may be used to secure the coupling pin. One-piece, self-locking pins may also be utilized. It is also contemplated that other types of connections may be utilized, such as bolts, rivets or other types of connectors.

The spinner 110 may be used in a fiberizing process to produce glass fibers. In this process the spinner 110 is rotated about its central axis and molten glass is poured into the slinger basket 130 at a location between the vent holes 136 and the interior side wall 132 of the slinger basket 130. A centrally positioned burner may be used to direct hot gasses into the slinger basket 130 to maintain a desired temperature in which case vent holes may be provided in the slinger basket 130, although the burner and vent holes may be omitted such as in the illustrated embodiment. The molten glass flows to the interior side wall 132 and passes through the distribution holes 135 in continuous streams of molten glass. The streams of molten glass provided to the interior surface of the peripheral side wall 122 of the spinner body 120 then flow out of the fiberizing holes formed therein. Fibers of glass exit the exterior surface of the peripheral side wall 122 and are further attenuated by a flow of hot gas.

It shall be appreciated that the form of spinner 110 illustrated in FIGS. 9-14 is one example of a rotary spinner including a slinger basket for producing fibers from molten material and that a number of additions, modifications, and variations of the illustrated structure are contemplated by the present disclosure, several examples of which shall now be described.

The bottom wall 133 of slinger basket 130 is one example of a base member extending radially outward from a central drive aperture structured to receive a rotary drive shaft. In other forms, a central drive aperture may be of different shapes or dimensions, and a base member may extend radially outward over a greater or lesser distance, may have a different shape relative to the illustrated embodiments, and may extend at a different angle or angles relative to those of the illustrated embodiments.

The side wall 132 of slinger basket 130 is one example of an annular side wall extending axially upward from a base and including a plurality of distribution holes defined therein. In other forms, a different number and pattern of distribution holes may be utilized, an annular side wall may extend axially upward from a different location and at different orientations relative to a base or relative to other structures of a slinger basket or spinner body, and an annular side wall may extend axially upward over a greater or lesser height, may have a different shape relative to the illustrated embodiments, and may extend at a different angle or angles relative to those of the illustrated embodiments.

The top wall 131 of slinger basket 130 is one example of an upper flange extending radially inward from an upper portion of the basket side wall to delimit an upper basket opening spanning the base. In other forms, an upper flange may extend radially inward from different locations and at different orientations relative to a basket side wall or relative to other structures of a slinger basket or spinner body, and an upper flange may extend radially inward over a greater or lesser distance, may have a different shape relative to the illustrated embodiments, and may extend at a different angle or angles relative to those of the illustrated embodiments.

The top wall 121 of spinner body 120 is one example of a roof member which extends radially outward from an upper basket opening. In other forms, a roof member may extend radially outward from different locations and at different orientations relative to a slinger basket or other structures of a spinner body or slinger basket, and a roof member may extend radially outward over a greater or lesser distance, may have a different shape relative to the illustrated embodiments, and may extend at a different angle or angles relative to those of the illustrated embodiments.

The peripheral side wall 122 of spinner body 120 is one example of an annular spinner side wall extending axially downward from a roof and including a plurality of fiberizing holes defined therein. In other forms, an annular spinner side wall may extend axially downward from different locations and at different orientations relative to other structures of a spinner body or slinger basket, and an annular spinner side wall may extend radially outward over a greater or lesser distance, may have a different shape relative to the illustrated embodiments, and may extend at a different angle or angles relative to those of the illustrated embodiments.

The bottom wall 123 of spinner body 120 is one example of a lower flange extending radially inward from a lower portion of a spinner side wall to delimit a lower spinner opening extending to a basket. In other forms, a lower flange may extend radially inward from different locations and at different orientations relative to other structures of a spinner body or slinger basket, and a lower flange may extend radially inward over a greater or lesser distance, may have a different shape relative to the illustrated embodiments, and may extend at a different angle or angles relative to those of the illustrated embodiments Spokes or struts 140 are one example of a plurality of spokes or struts coupled with and extending between and coupling a slinger basket and a spinner body. In other forms, a different number of spokes or struts may be utilized to couple a slinger basket and a spinner body, and spokes or struts may have different dimensions and shapes and may be coupled with a slinger basket or a spinner body at different locations and with different coupling structures or fasteners than those of the illustrated embodiment.

It shall be appreciated that the embodiments illustrated and described in connection with FIGS. 9-14 are non-limiting examples of rotary spinners and systems including rotary spinners wherein a spinner body is not directly coupled with a drive shaft. Additionally, the embodiments illustrated and described in connection with FIGS. 9-14 are non-limiting examples of embodiment wherein a spinner body is directly coupled only with a slinger basket. Furthermore, the embodiments illustrated and described in connection with FIGS. 9-14 are non-limiting examples of embodiments wherein only a slinger basket is directly coupled with the drive shaft.

With reference to FIGS. 15-20 there are illustrated patterns of fiberizing holes that may be provided in peripheral side walls 22, 122, 222, 322, 422, 522, 622, 722, and 922 of spinners 11, 12, 13, 14, 15, 16, 110, 210, 310, 410, 510, 610, 710, 810 and 910, respectively. In particular, FIGS. 15-20 illustrate a number of example fiberizing hole patterns 192, 292, 392, 492, 592 and 692, each of which include a plurality of rows of fiberizing holes extending in a horizontal direction and a plurality of columns of fiberizing holes extending in a vertical direction.

Patterns 192, 292, 392, 492, 592 and 692 illustrate several examples of how the diameter or size of fiberizing holes may vary or remain constant in the vertical direction. In pattern 192 the plurality of rows of fiberizing holes extending in a vertical direction have a substantially constant diameter. In pattern 292 the plurality of rows of fiberizing holes extending in a vertical direction vary in diameter with an increase in diameter from top to middle and a decrease in diameter from middle to bottom. In pattern 392 the plurality of rows of fiberizing holes extending in a vertical direction vary in diameter with a decrease in diameter from top to bottom. In pattern 492 the plurality of rows of fiberizing holes extending in a vertical direction vary in diameter with an increase in diameter from top to bottom. In pattern 592 the plurality of rows of fiberizing holes extending in a vertical direction vary in diameter with an increase in diameter from top to middle and a decrease in diameter from middle to bottom wherein the smallest top diameter is larger than the smallest bottom diameter. In pattern 692 the plurality of rows of fiberizing holes extending in a vertical direction vary in diameter with a decrease in diameter from top to middle and an increase in diameter from middle to bottom.

In patterns 192, 292, 392, 492, 592 and 692 the fiberizing holes are arranged with a generally rectangular lattice and rectangular unit cell pattern. It shall nevertheless be appreciated that other embodiments may include different patterns, for example, a rectangular lattice and a centered rectangular unit cell, a hexagonal lattice and hexagonal unit cell, a parallelogram lattice and parallelogram unit cell among other lattice and unit cell patterns. It shall be further appreciated that, in the illustrated forms, the annularly extending rows of fiberizing holes are provided in a continuous, uninterrupted pattern. In certain preferred forms, there is no structure that interrupts or interferes with any of the rows of fiberizing holes. Other forms are contemplated in which one or more structures interrupts or interferes with any of the rows or columns of fiberizing holes.

With reference to FIGS. 21, 22, 23, 24, 25, 26, 27, 28 and 29 there are illustrated partial side sectional views of several further forms of example spinners 210, 310, 410, 510, 610, 810, 910, and 1010 respectively, which may be referred to collectively as FIGS. 21-29 and spinners 210-1010. In particular, the illustrated views depict sections of one-half of each of spinners 210-1010 extending radially outward from axial center line A-A, which is located at a central point of central opening 137, 237, 337, 437, 537, 637, 737, 837, 937 and 1037, respectively. Spinners 210-1010 may include a number of elements and features which are the same as, similar to or otherwise correspond to the elements and features of the several forms of example embodiment of the spinners 11-16 described above.

In FIGS. 21-29, elements and features which are the same as, similar to or otherwise correspond to the elements and features of the several forms of example spinner 11 are indicated with reference numerals that are incremented relative to the reference numerals used in connection with spinner 11 by 200, 300, 400, 500, 600, 800, 900, and 1000 respectively. Thus, for example, spinner body 20 and its constituent elements and features generally correspond to spinner bodies 220-1020 and their correspondingly numerically incremented constituent elements and features. Similarly, slinger basket 30 and its constituent elements and features generally correspond to slinger basket 230-1030 and their correspondingly numerically incremented constituent elements and features. Likewise, retaining ring 40 and its constituent elements and features generally corresponds to retaining rings 240-1040 and their correspondingly numerically incremented constituent elements and features. Similarly, bolt 99 generally corresponds to bolts, 299-1099. It shall be further appreciated that the elements, features, additions, alternatives, modifications, and variations described above in connection with the various forms of spinners 11-16 may apply, mutatis mutandis, to spinners 210-1010. It shall be further appreciated that spinners 210-1010 vary from spinners 11-16 in various respects.

Figure 21:
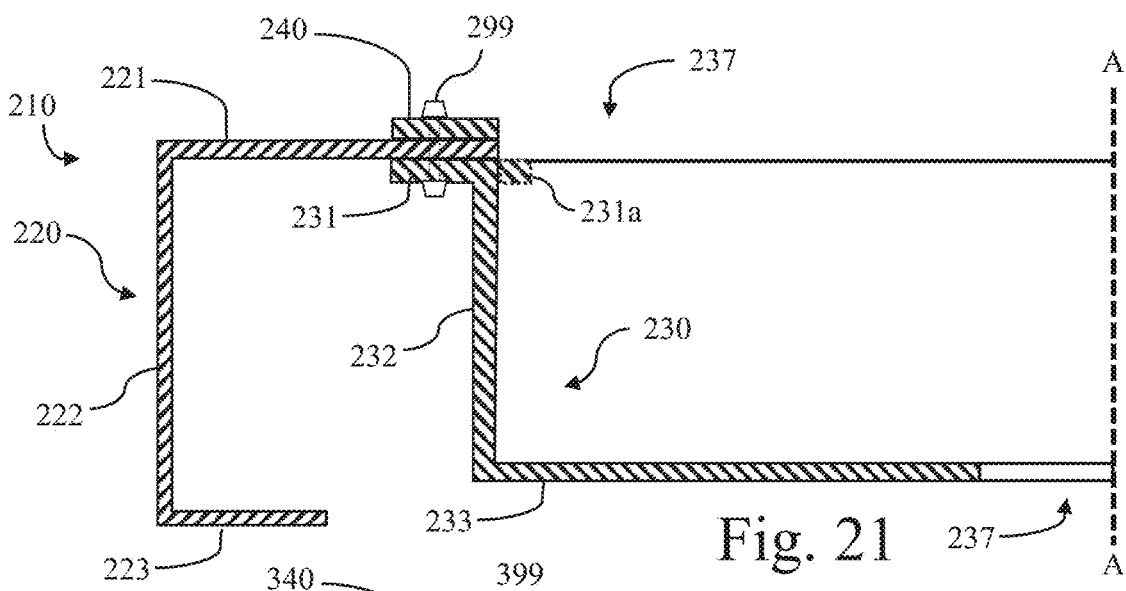
FIGS. 21-29 are partial side section views of certain aspects of spinners according to several further example embodiments.

With reference to FIG. 21, spinner 210 varies from spinners 11-16 in certain respects. For example, in spinner 210 the top wall 231 of slinger basket 230 extends radially outward relative to interior side wall 232, whereas in spinner 11 the top wall 31 of slinger basket 30 extends radially inward relative to interior side wall 32. Top wall 231 of slinger basket 230 may optionally include a portion 231a which extends radially inward relative to interior side wall 232 and which provides an additional degree of containment of molten glass introduced into slinger basket 230. In further forms, the top wall of a slinger basket according to the present disclosure may extend both radially inward and radially outward relative to a slinger basket interior side wall. In other forms, the top wall of a slinger basket according to the present disclosure may be substantially co-extensive with a slinger basket interior side wall in one or both of the radially inward direction and the radially outward direction. In some forms, a slinger basket interior side wall may comprise an upper portion of a top wall.

Figure 22:
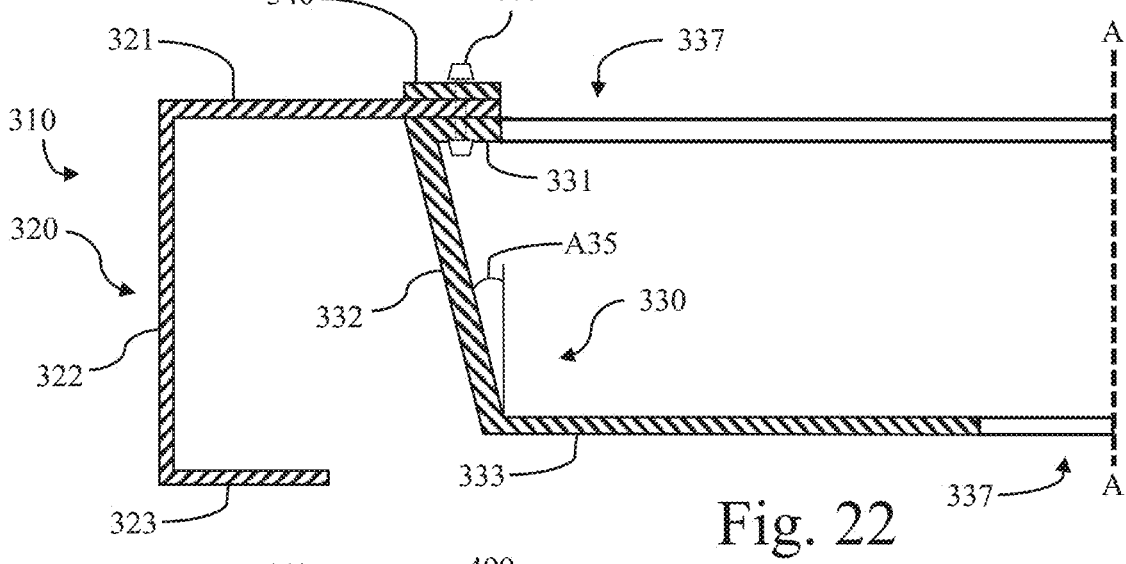

With reference to FIG. 22, spinner 310 varies from spinners 11-16 in certain respects. For example, like interior side wall 32 of slinger basket 30, interior side wall 332 of slinger basket 330 is an example of an annular side wall extending axially upward from a base and including a plurality of distribution holes defined therein; however, interior side wall 332 of slinger basket 330 also extends radially outward. In the illustrated form, interior side wall 332 extends concurrently axially upward and radially outward at a predetermined angle A35. In certain forms, angle A35 may range from 0 to 25 degrees, although other angles and angle ranges are also contemplated. In further forms, an interior side wall may extend in segments with different angles. In further forms, an interior side wall may extend with a curvature over a portion or all of its extent. Combinations of these and other variations are also contemplated.

Figure 23:
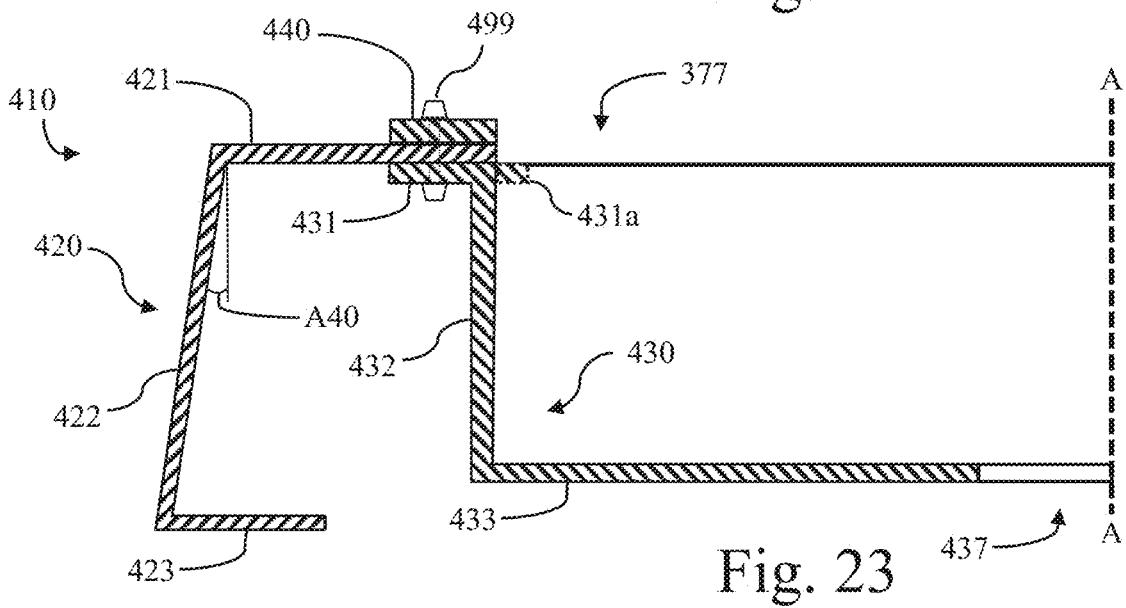

With reference to FIG. 23, spinner 410 varies from spinners 11-16 in certain respects. For example, in spinner 410 the top wall 431 of slinger basket 430 extends radially outward relative to interior side wall 432. Top wall 431 of slinger basket 430 may optionally include a portion 431a which extends radially inward relative to interior side wall 432 and which provides an additional degree of containment of molten glass introduced into slinger basket 430. As another example, like peripheral side wall 22 of spinner body 20, peripheral side wall 422 of spinner body 420 is one example of an annular spinner side wall extending axially downward from a roof and including a plurality of fiberizing holes defined therein; however, peripheral side wall 422 of spinner body 420 also extends radially outward. In the illustrated form, peripheral side wall 422 extends concurrently axially downward and radially outward at a predetermined angle A40. In certain forms, angle A40 may range from zero to 10 degrees, although other angles and angle ranges are also contemplated. In further forms, an interior side wall may extend in segments with different angles. In further forms, an interior side wall may extend with a curvature over a portion or all of its extent. Combinations of these and other variations are also contemplated.

Figure 24:
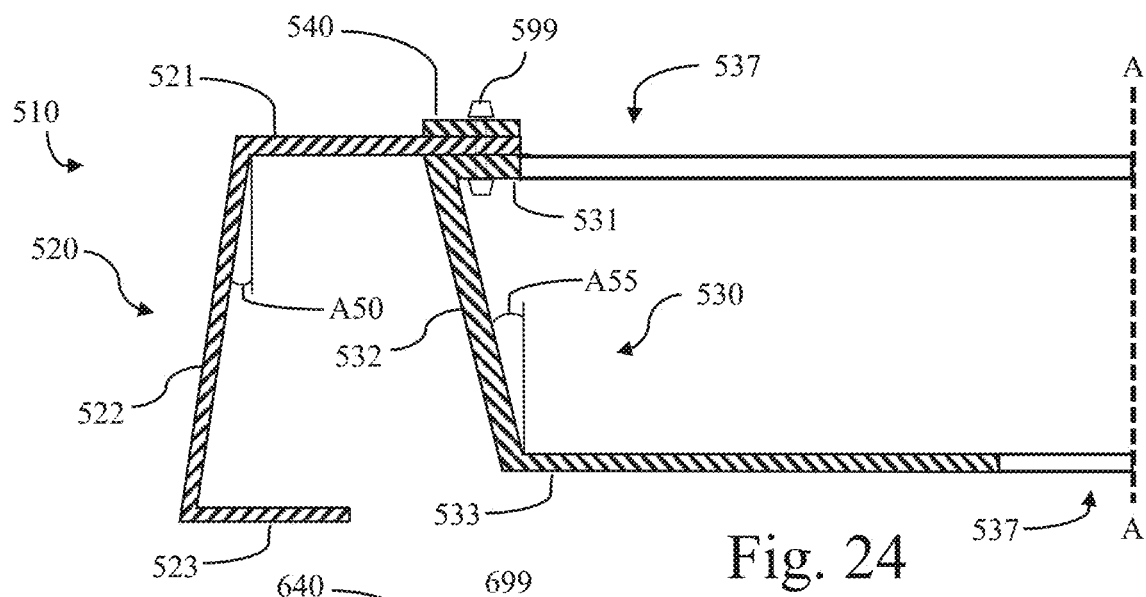

With reference to FIG. 24, spinner 510 varies from spinners 11-16 in certain respects. For example, like interior side wall 32 of slinger basket 30, interior side wall 532 of slinger basket 530 is an example of an annular side wall extending axially upward from a base and including a plurality of distribution holes defined therein; however, interior side wall 532 of slinger basket 530 also extends radially outward. In the illustrated form, interior side wall 532 extends concurrently axially upward and radially outward at a predetermined angle A55. In certain forms, angle A55 may range from zero to 25 degrees, although other angles and angle ranges are also contemplated. In further forms, an interior side wall may extend in segments with different angles. In further forms, an interior side wall may extend with a curvature over a portion or all of its extent. Combinations of these and other variations are also contemplated.

As another example, like peripheral side wall 22 of spinner body 20, peripheral side wall 522 of spinner body 520 is one example of an annular spinner side wall extending axially downward from a roof and including a plurality of fiberizing holes defined therein; however, peripheral side wall 522 of spinner body 520 also extends radially outward. In the illustrated form, peripheral side wall 522 extends concurrently axially downward and radially outward at a predetermined angle A50. In certain forms, angle A50 may range from zero to 10 degrees, although other angles and angle ranges are also contemplated. In further forms, an interior side wall may extend in segments with different angles. In further forms, an interior side wall may extend with a curvature over a portion or all of its extent. Combinations of these and other variations are also contemplated.

Figure 25:
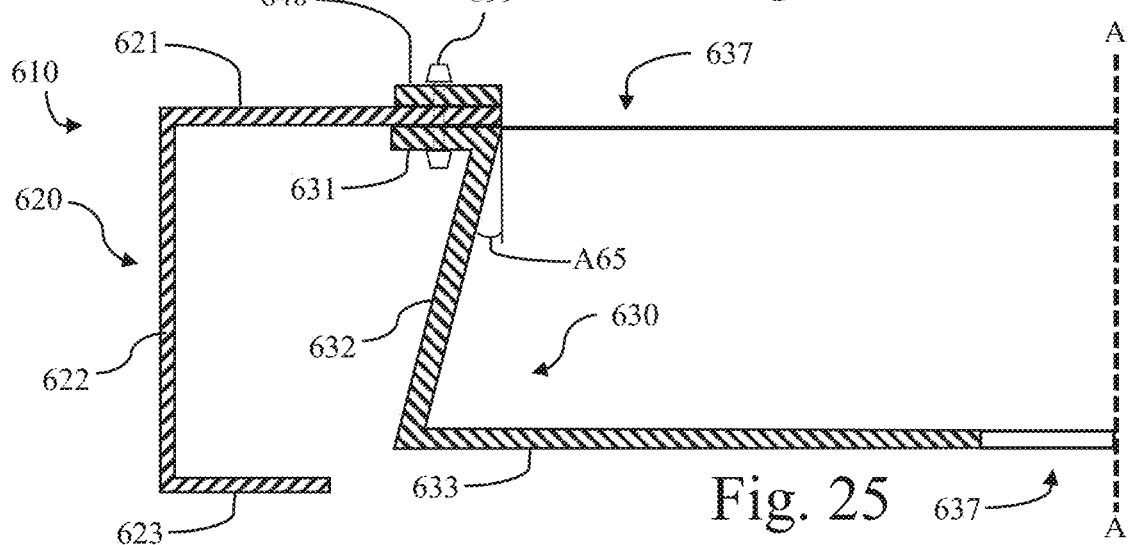

With reference to FIG. 25, spinner 610 varies from spinners 11-16 in certain respects. For example, like interior side wall 32 of slinger basket 30, interior side wall 632 of slinger basket 630 is an example of an annular side wall extending axially upward from a base and including a plurality of distribution holes defined therein; however, interior side wall 632 of slinger basket 630 also extends radially inward. In the illustrated form, interior side wall 632 extends concurrently axially upward and radially inward at a predetermined angle A65. In certain forms, angle A65 may range from zero to 20 degrees, although other angles and angle ranges are also contemplated. In further forms, an interior side wall may extend in segments with different angles. In further forms, an interior side wall may extend with a curvature over a portion or all of its extent. Combinations of these and other variations are also contemplated.

Figure 26:
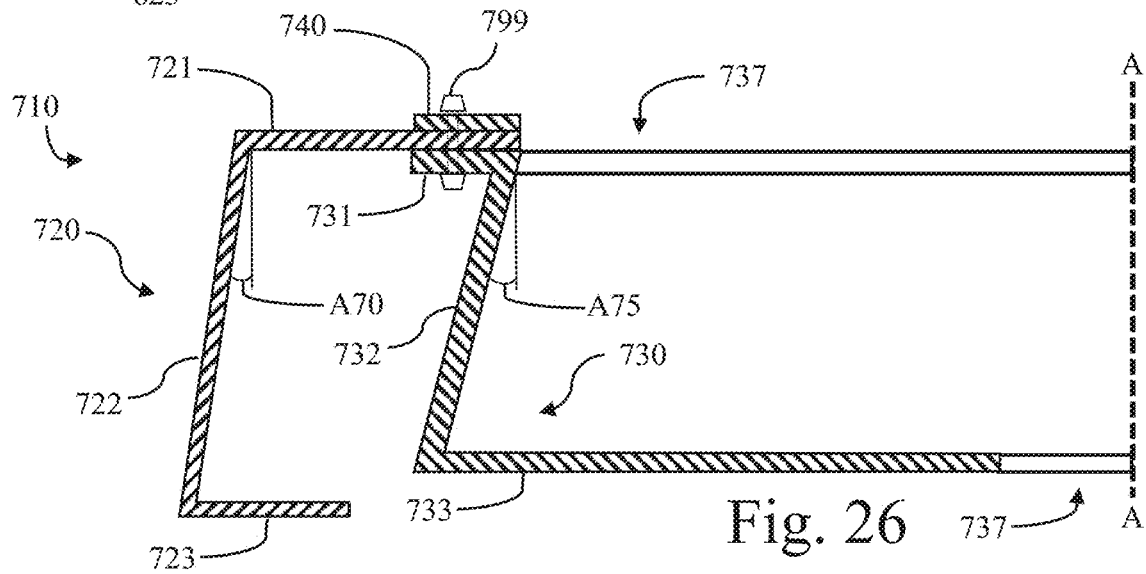

With reference to FIG. 26, spinner 710 varies from spinners 11-16 in certain respects. For example, like interior side wall 32 of slinger basket 30, interior side wall 732 of slinger basket 730 is an example of an annular side wall extending axially upward from a base and including a plurality of distribution holes defined therein; however, interior side wall 732 of slinger basket 730 also extends radially inward. In the illustrated form, interior side wall 732 extends concurrently axially upward and radially inward at a predetermined angle A75. In certain forms, angle A75 may range from zero to 20 degrees, although other angles and angle ranges are also contemplated. In further forms, an interior side wall may extend in segments with different angles. In further forms, an interior side wall may extend with a curvature over a portion or all of its extent. Combinations of these and other variations are also contemplated.

As another example, like peripheral side wall 22 of spinner body 20, peripheral side wall 722 of spinner body 720 is one example of an annular spinner side wall extending axially downward from a roof and including a plurality of fiberizing holes defined therein; however, peripheral side wall 722 of spinner body 720 also extends radially outward. In the illustrated form, peripheral side wall 722 extends concurrently axially downward and radially outward at a predetermined angle A70. In certain forms, angle A70 may range from zero to 10 degrees, although other angles and angle ranges are also contemplated. In further forms, an interior side wall may extend in segments with different angles. In further forms, an interior side wall may extend with a curvature over a portion or all of its extent. Combinations of these and other variations are also contemplated.

Figure 27:
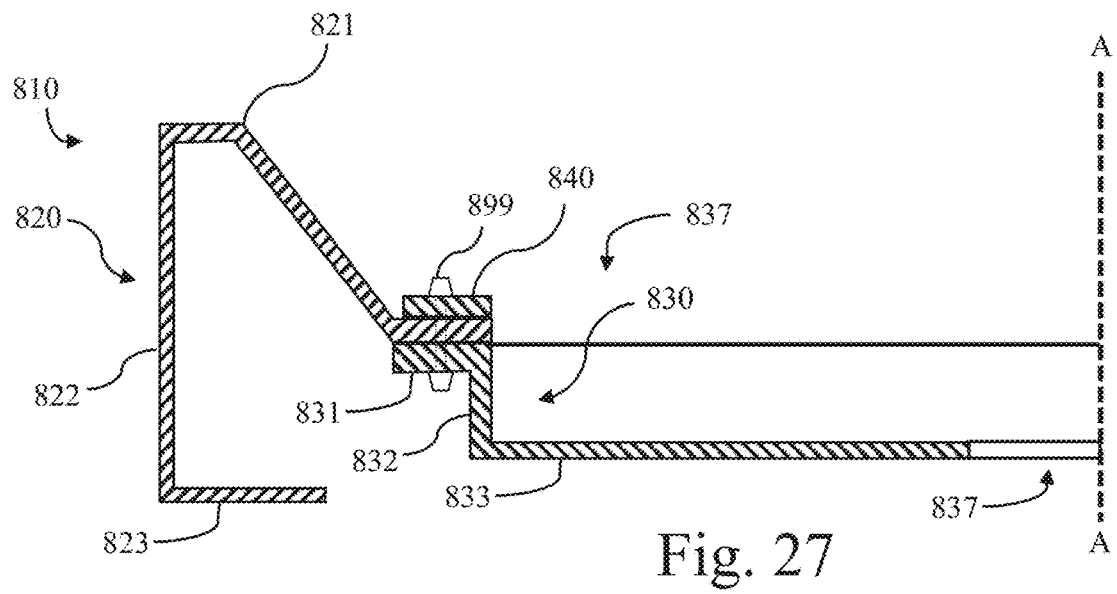

With reference to FIG. 27, spinner 810 varies from spinners 11-16 in certain respects. For example, like top wall 21 of spinner body 20, top wall 821 is an example of a roof member which extends radially outward from an upper basket opening; however, top wall 821 of spinner body 820 also extends axially upward over a portion of its width. In the illustrated form, a portion of top wall 821 extends concurrently axially upward and radially outward at a predetermined angle. The predetermined angle may be determined by the difference in diameter between spinner body 820 and slinger basket 830 and the difference in height between their respective side walls 822 and 832. Such configurations may be used to reduce the height of the slinger basket 830, thereby reducing the amount of material used to form it, while maintaining the height of the spinner body 820 to a desired height, for example, in some forms a height of about 2 inches. Another portion of top wall 821 extends only radially outward. In further forms, an interior side wall may extend in segments with different angles. In further forms, an interior side wall may extend with a curvature over a portion or all of its extent. Combinations of these and other variations are also contemplated.

The form of spinner 810 illustrated in FIG. 27 is one example of a spinner in which the axial height of a slinger basket is reduced relative to a spinner body with which it is coupled. In principle, the axial height of slinger basket 830 may be as small as the height that will accommodate a single annular row of distribution holes in interior side wall 832 while still maintaining structural integrity. In other forms, a slinger basket with reduced axial height relative to the slinger basket of spinner 11 may be provided at different vertical levels relative to the height of peripheral side wall 822 of spinner body 820.

Figure 28:
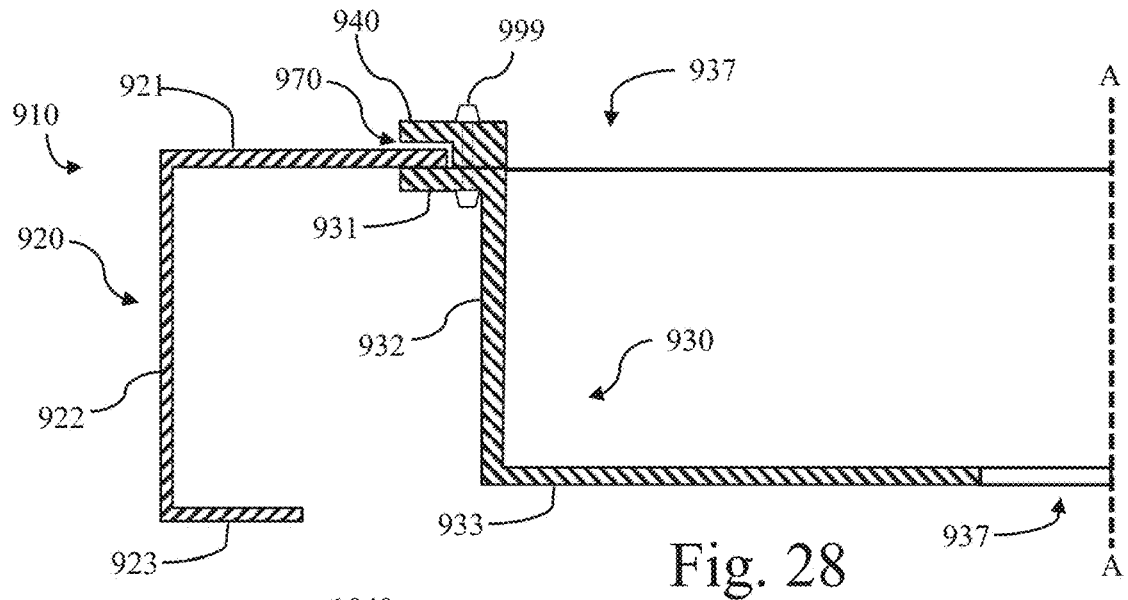

With reference to FIG. 28, spinner 910 varies from spinners 11-16 in certain respects. For example, retaining ring 940 contacts and is retained against top wall 931 of slinger basket 930 by bolt 999 which may apply a clamping force to these components. On the other hand, a gap 970 is provided between retaining ring 940 and top wall 921 of spinner body 920. The amount of gap may be selected to accommodate relative motion between the spinner body 920 on the one hand and the slinger basket 930 and retaining ring 940 on the other hand, which may experience different thermal expansion during operation of spinner 910. In certain embodiments, gap 970 may be sized to be 0.005-0.010 inches.

Figure 29:
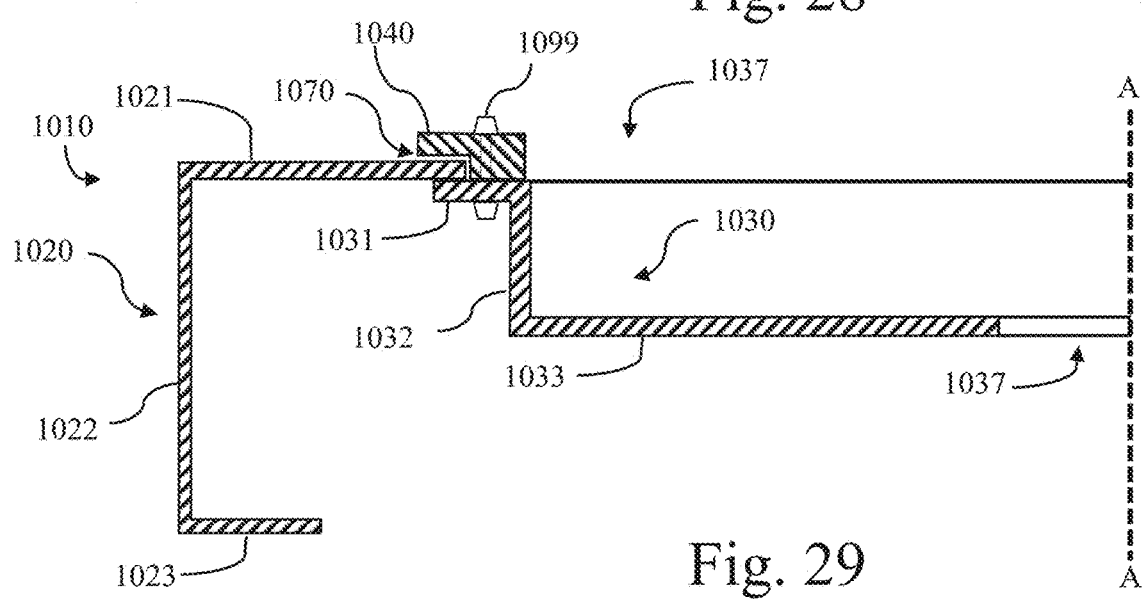

With reference to FIG. 29, spinner 1010 varies from spinners 11-16 in certain respects. For example, retaining ring 1040 contacts and is retained against top wall 1031 of slinger basket 1030 by bolt 1099 which may apply a clamping force to these components. On the other hand, a gap 1070 is provided between retaining ring 1040 and top wall 1021 of spinner body 1020. The amount of gap may be selected to accommodate relative motion between the spinner body 1020 on the one hand and the slinger basket 1030 and retaining ring 1040 on the other hand, which may experience different thermal expansion during operation of spinner 1010. In certain embodiments, gap 1070 may be sized to be 0.005-0.010 inches.

It shall be appreciated that the embodiments illustrated and described in connection with FIGS. 21-29 are non-limiting examples of rotary spinners and systems including rotary spinners wherein a spinner body is not directly coupled with a drive shaft. Additionally, the embodiments illustrated and described in connection with FIGS. 21-29 are non-limiting examples of embodiment wherein a spinner body is directly coupled only with a slinger basket. Furthermore, the embodiments illustrated and described in connection with FIGS. 21-29 are non-limiting examples of embodiments wherein only a slinger basket is directly coupled with the drive shaft. In addition, the embodiments illustrated and described in connection with FIGS. 21-29 are non-limiting examples of embodiments wherein a slinger basket is directly coupled with a drive shaft by an upper retaining member, a lower retaining member, and a plurality of fasteners which clamp the slinger basket between the upper retaining member and the lower retaining member. Additionally, the embodiments illustrated and described in connection with FIGS. 21-29 are non-limiting examples of embodiment wherein the roof of the spinner body is substantially perpendicular to the axis of the drive shaft. Furthermore, the embodiments illustrated and described in connection with FIGS. 21-29 are non-limiting examples of embodiments wherein the upper flange is substantially parallel with the roof and an upper surface of the upper flange contacts a lower surface of the roof.

With reference to FIGS. 31-34, there are illustrated partial side sectional views, respectively, of spinners according to several further example embodiments. The features of the spinners illustrated in FIGS. 31-34 may be incorporated into or substituted into any of spinners 11, 12, 13, 14, 15, 16 and are illustrated as including a number of features that are the same as, similar to or otherwise correspond to the features of these spinners as indicated with like reference numerals. The features of the spinners illustrated in FIGS. 31-34 also vary from these spinners in certain respects. As illustrated in FIG. 31, the foregoing spinners may include a spinner body 20' including a top wall 21' comprising one or more voids 27' which are provided to reduce the surface contact area between top wall 21' and top wall 31 of the slinger basket 30. The voids 27' may extend over a range which is radially inward from the radially innermost extent of top wall 31. As illustrated in FIG. 32, the foregoing spinners may include a spinner body 20" including a top wall 21" comprising one or more voids 27" which are provided to reduce the surface contact area between top wall 21" and top wall 31 of the slinger basket 30. The voids 27" may extend over a range which is radially inward from the radially innermost extent of top wall 31. As illustrated in FIG. 33, the foregoing spinners may include a slinger basket 30' including a top wall 31' comprising one or more voids 39' which are provided to reduce the surface contact area between top wall 31' and top wall 21 of the slinger basket spinner body 20. The voids 39' may extend over a range which is radially inward from the radially innermost extent of top wall 31'. As illustrated in FIG. 34, the foregoing spinners may include a slinger basket 30" including a top wall 31" comprising one or more voids 39" which are provided to reduce the surface contact area between top wall 31" and top wall 21 of the slinger basket spinner body 20. The voids 39" may extend over a range which is radially inward from the radially innermost extent of top wall 31. It shall be further appreciated that the foregoing spinners may include combinations of any two or more, any three or more, or all of the embodiments of FIGS. 31-34 as well as voids in other locations effective to reduce surface contact areas between a spinner body and a slinger basket.

With reference to 35, there is illustrated a partial top view of a spinner 20''' the features of which may be incorporated into or substituted into any of spinners 11, 12, 13, 14, 15, 16. Spinner 20''' includes a number of features that are the same as, similar to or otherwise correspond to the features of these spinners. Spinner 21''' further includes a plurality of relief voids 25 provided in the inner periphery of top wall 21''' and which provide stress relief during thermal expansion and contraction of spinner 20'''.

A further aspect of the present disclosure provides a method a manufacturing mineral wool fibers comprising: providing a rotating, rotary spinner as disclosed herein; and fiberizing a mineral melt by pouring the mineral melt onto the base of the slinger basket of the rotating, rotary spinner. In one example method embodiment according to the aforementioned aspect, the method comprises manufacturing mineral wool fibers having a chemical composition comprising: 30 to 55 wt % $SiO_2$, and 10 to 30 wt % $Al_2O_3$, and 4 to 14 wt % total iron expressed as $Fe_2O_3$, and 20 to 35 wt % of the combination of CaO and MgO, preferably ≥25 wt % and/or ≤30 wt %, and less than 8 wt % of the combination of $Na_2O$ and $K_2O$, preferably ≥1 wt % or ≥2 wt % and/or ≤5 wt % or ≤4 wt %, and preferably, an alkali/alkaline-earth ratio which is ≤1. In another example method embodiment according to the aforementioned aspect, the method comprises manufacturing mineral wool fibers having a chemical composition comprising: 30 to 55 wt % $SiO_2$, preferably 39 to 52 wt %; $SiO_2$ and 10 to 30 wt % $Al_2O_3$, preferably 16 to 26 wt % $Al_2O_3$ and 4 to 14 wt % total iron expressed as $Fe_2O_3$, and 8 to 23 wt % of the combination of CaO and MgO, preferably ≥10 wt %, ≥12 wt % or ≥15 wt % and/or ≤22 wt % or ≤20 wt % or ≤18 wt %, and 4 to 24 wt % of the combination of $Na_2O$ and $K_2O$, preferably may ≥5 wt % or ≥6 wt % and/or ≤12 wt % or ≤10 wt %; and preferably an alkali/alkaline-earth ratio which is <1. In each of the foregoing example method embodiments: the quantity of $SiO_2$ in the mineral wool fibers may be ≥35 wt % or ≥38 wt % and/or ≤50 wt %, or ≤45 wt %; and/or the quantity of $Al_2O_3$ in the mineral wool fibers may be ≥12 wt % or ≥15 wt % and/or ≤25 wt % or ≤20 wt %; and/or the total iron content expressed as $Fe_2O_3$ in the mineral wool fibers may be ≥5 wt % or ≥6 wt % and/or ≤13 wt %, ≤12 wt % or ≤10 wt %; and the ratio of alkali/alkaline-earth, which as is conventional is expressed in terms of wt % of the oxides e.g. $(Na_2O+K_2O)/(CaO$ and $MgO)$, is preferably <1. The term wt % as used herein signifies weight %. In another example method embodiment according to this aforementioned aspect, the method comprises manufacturing mineral wool fibers having a chemical composition comprising: 55 to 75 wt %; $SiO_2$, and 5 to 20 wt % of the combination of CaO and MgO, and 5 to 20 wt % of the combination of $Na_2O$ and $K_2O$, and 0 to 5 wt % $Al_2O_3$, and 0 to 2 wt % total iron expressed as $Fe_2O_3$, and an alkali/alkaline-earth ratio which is >1 and in this example method embodiment: the quantity of $SiO_2$ in the mineral wool fibers is preferably ≥60 wt % or ≥62 wt % and/or ≤72 wt %, or ≤70 wt %; and/or the quantity of $Al_2O_3$ in the mineral wool fibers is preferably ≥1 wt % or ≥2 wt % and/or ≤7 wt % or ≤5 wt %; and/or the quantity of the combination of CaO and MgO in the mineral wool fibers is preferably ≥11 wt % or ≥13 wt % and/or ≤22 wt % or ≤20 wt %; and/or the quantity of the combination of $Na_2O$ and $K_2O$ in the mineral wool fibers is preferably ≥7 wt % and/or ≤15 wt %, or ≤12 wt % or ≤10 wt %; and/or total iron content expressed as $Fe_2O_3$ in the mineral wool fibers is preferably ≤1 wt % or ≤0.8 wt %.

A number of example embodiments shall now be further described. A first example embodiment is a system for producing fibers from molten material, the system comprising: a drive shaft rotatable about an axis extending in an axial direction; a slinger basket including a base, a side wall, an upper flange, and an interior void, the base extending radially outward from a joint operatively coupling the drive shaft and the slinger basket, the side wall extending axially upward from the base and including a plurality of distribution holes defined therein, the upper flange extending radially from the side wall, the interior void extending radially from the drive shaft to the side wall and extending axially from the base to an upper opening, the upper opening extending radially outward from the drive shaft toward the upper flange; and a spinner body coupled with the slinger basket, the spinner body including a roof contacting and extending radially outward from the upper flange such that the upper opening is substantially unobstructed by the spinner body, a spinner side wall extending axially downward from the roof and including a fiberizing region including a plurality of fiberizing holes provided therein, and a lower flange extending radially inward from the spinner side wall.

In a first form of the first example embodiment the plurality of fiberizing holes are provided in a fiberizing region of the side wall extending from a lower axial height to an upper axial height, and the plurality of distribution holes are positioned to direct a corresponding plurality of streams of molten material onto the fiberizing region of the side wall during rotation of the slinger basket and the spinner body.

In a second form of the first example embodiment, the plurality of fiberizing holes are provided in a fiberizing region of the side wall extending from a lower axial height to an upper axial height, and the plurality of distribution holes are positioned to direct a corresponding plurality of streams of molten material onto the fiberizing region of the side wall during rotation of the slinger basket, and the spinner body and the plurality of distribution holes are positioned to direct the plurality of streams of molten material onto only an axially upper portion of the fiberizing region.

In a third form of the first example embodiment, the plurality of fiberizing holes are provided in a fiberizing region of the side wall extending from a lower axial height to an upper axial height, and the plurality of distribution holes are positioned to direct a corresponding plurality of streams of molten material onto the fiberizing region of the side wall during rotation of the slinger basket, the spinner body and the plurality of distribution holes are positioned to direct the plurality of streams of molten material onto only an axially upper portion of the fiberizing region, and the axially upper portion comprises an axially upper 50% or less of the fiberizing region.

In a fourth form of the first example embodiment, the plurality of fiberizing holes are provided in a fiberizing region of the side wall extending from a lower axial height to an upper axial height, the plurality of distribution holes are positioned to direct a corresponding plurality of streams of molten material onto the fiberizing region of the side wall during rotation of the slinger basket, and the spinner body and the plurality of distribution holes are positioned to direct the plurality of streams of molten material onto only an axially upper portion of the fiberizing region, and the plurality of distribution holes consist essentially of two rows of distribution holes.

In a fifth form of the first example embodiment, the plurality of fiberizing holes are provided in a fiberizing region of the side wall extending from a lower axial height to an upper axial height, and the plurality of distribution holes are positioned to direct a corresponding plurality of streams of molten material onto the fiberizing region of the side wall during rotation of the slinger basket and the spinner body, and the plurality of distribution holes are positioned to direct the plurality of streams of molten material onto substantially all of the fiberizing region.

In a sixth form of the first example embodiment, the plurality of fiberizing holes are provided in a fiberizing region of the side wall extending from a lower axial height to an upper axial height, and the plurality of distribution holes are positioned to direct a corresponding plurality of streams of molten material onto the fiberizing region of the side wall during rotation of the slinger basket and the spinner body, and the plurality of distribution holes are positioned to direct the plurality of streams of molten material onto substantially all of the fiberizing region, and the plurality of distribution holes consist essentially of four rows of distribution holes.

In a seventh form of the first example embodiment, the distribution holes are sized and positioned such that, during rotation of the slinger basket and the spinner body, molten material dropped into the upper opening from a position radially outward from the rotary drive shaft follows a flow path extending along the base of the slinger basket to the side wall of the slinger basket, along the side wall of the slinger basket to the plurality of distribution holes, from the plurality of distribution holes to the spinner side wall as a plurality of streams spanning a structure free gap between the slinger basket and the spinner side wall, and through the fiberizing holes to exit the rotary spinner.

An eighth form of the first example embodiment, includes one or more of: (a) the spinner body is not directly coupled with the drive shaft, (b) the spinner body is directly coupled only with the slinger basket and the spinner body is directly coupled with the slinger basket by a retaining member and one or more fasteners, (c) only the slinger basket is directly coupled with the drive shaft, and/or (d) and the slinger basket is directly coupled with the drive shaft by an upper retaining member, a lower retaining member, and a plurality of fasteners which clamp the slinger basket between the upper retaining member and the lower retaining member.

In a ninth form of the first example embodiment, the roof of the spinner body is substantially perpendicular to the axis of the drive shaft. Further forms include the ninth form in combination with any one of the first through eighth forms of the first example embodiment.

In a tenth form of the first example embodiment, the upper flange is substantially parallel with the roof and an upper surface of the upper flange contacts a lower surface of the roof. Further forms include the tenth form in combination with any one of the first through eighth forms of the first example embodiment.

In an eleventh form of the first example embodiment, the roof of the spinner body is substantially perpendicular to the axis of the drive shaft, and the upper flange is substantially parallel with the roof and an upper surface of the upper flange contacts a lower surface of the roof. Further forms include the eleventh form in combination with any one of the first through eighth forms of the first example embodiment.

In a twelfth form of the first example embodiment, the roof of the spinner body is substantially perpendicular to the axis of the drive shaft, and the upper flange is substantially parallel with the roof and an upper surface of the upper flange contacts a lower surface of the roof, and a retaining member is positioned above the roof and a plurality of fasteners extending into holes in the retaining member, the roof and the upper flange to couple the slinger basket and the spinner body. Further forms include the twelfth form in combination with any one of the first through eighth forms of the first example embodiment.

In a thirteenth form of the first example embodiment, the roof of the spinner body is substantially perpendicular to the axis of the drive shaft, and the upper flange is substantially parallel with the roof and an upper surface of the upper flange contacts a lower surface of the roof, and a retaining member is positioned above the roof and a plurality of fasteners extending into holes in the retaining member, the roof and the upper flange to couple the slinger basket and the spinner body, and the fasteners impart a clamping force permitting relative movement between the upper flange and the roof during thermal expansion and contraction. Further forms include the thirteenth form in combination with any one of the first through eighth forms of the first example embodiment.

A fourteenth form of the first example embodiment includes one or more of: (a) a first plurality of gussets provided in the slinger basket and extending axially between the base and the upper flange and radially inward from the interior side wall; (b) a second plurality of gussets provided in the spinner body and extending axially between the roof and the lower flange and radially inward from the spinner side wall; and (c) the first plurality of gussets provided in the slinger basket and extending axially between the base and the upper flange and radially inward from the spinner side wall and the second plurality of gussets provided in the spinner body and extending axially between the roof and the lower flange and radially inward from the spinner side wall. Further forms include the fourteenth form in combination with any one of the first through eighth forms of the first example embodiment.

A second example embodiment is a method of operating the system of the first example embodiment, or the system of any of the first through fourteenth forms of the first example embodiment, the method comprising: rotating the drive shaft to rotate the slinger basket and the spinner body; pouring molten material onto the base of the rotating slinger basket through the upper opening from a position radially outward from the rotary drive shaft and axially above the slinger basket; centrifugally flowing the molten material along the base to the side wall and up the side wall to the plurality of distribution holes; centrifugally streaming the molten material from the plurality of distribution holes to the spinner side wall as a plurality of streams spanning a structure free gap between the slinger basket and the spinner side wall; and centrifugally passing the molten material through the fiberizing holes to exit the rotary spinner.

A third example embodiment is rotary spinner for producing fibers from molten material, the rotary spinner comprising: a slinger basket including a base extending radially outward from a central drive aperture structured to receive a rotary drive shaft, a side wall extending axially upward from the base and including a plurality of distribution holes defined therein, and an upper flange extending from the side wall and to an upper basket opening spanning the base; and a spinner body including a roof positioned above the upper flange and extending radially outward from the upper basket opening, the upper basket opening being substantially uncovered by the roof, a spinner side wall extending axially downward from the roof and including a plurality of fiberizing holes defined therein, and a lower flange extending radially inward from the spinner side wall to a lower spinner opening.

In a first form of the third example embodiment, the plurality of fiberizing holes are provided in a fiberizing region of the side wall extending between a lower axial height and an upper axial height, and the plurality of distribution holes are positioned to direct a corresponding plurality of streams of molten material onto the fiberizing region of the side wall during rotation of the slinger basket and the spinner body.

In a second form of the third example embodiment, the plurality of fiberizing holes are provided in a fiberizing region of the side wall extending between a lower axial height and an upper axial height, and the plurality of distribution holes are positioned to direct a corresponding plurality of streams of molten material onto the fiberizing region of the side wall during rotation of the slinger basket and the spinner body, and the plurality of distribution holes are positioned to direct the plurality of streams of molten material onto only an axially upper portion of the fiberizing region.

In a third form of the third example embodiment, the plurality of fiberizing holes are provided in a fiberizing region of the side wall extending between a lower axial height and an upper axial height, and the plurality of distribution holes are positioned to direct a corresponding plurality of streams of molten material onto the fiberizing region of the side wall during rotation of the slinger basket and the spinner body, and the plurality of distribution holes are positioned to direct the plurality of streams of molten material onto only an axially upper portion of the fiberizing region, and the axially upper portion comprises substantially an axially upper 50% or less of the fiberizing region.

In a fourth form of the third example embodiment, the plurality of distribution holes comprises two rows of distribution holes.

In a fifth form of the third example embodiment, the plurality of distribution holes are positioned to direct the plurality of streams of molten material onto substantially all of the fiberizing region.

In a sixth form of the third example embodiment, the plurality of distribution holes comprises two rows of distribution holes, and the plurality of distribution holes are positioned to direct the plurality of streams of molten material onto substantially all of the fiberizing region.

In a seventh form of the third example embodiment, the plurality of distribution holes are positioned to direct the plurality of streams of molten material onto substantially all of the fiberizing region, and the plurality of distribution holes comprises four rows of distribution holes.

In an eighth form of the third example embodiment, the distribution holes are sized and positioned such that, during rotation of the slinger basket and the spinner body, molten material dropped into the upper basket opening from a position radially outward from the rotary drive shaft follows a flow path extending along the base of the slinger basket to the side wall of the slinger basket, along the side wall of the slinger basket to the plurality of distribution holes, from the plurality of distribution holes to the spinner side wall as a plurality of streams spanning a structure free gap between the slinger basket and the spinner side wall, and through the fiberizing holes to exit the rotary spinner.

In a ninth form of the third example embodiment, drive shaft and the spinner body are not directly coupled with one another.

In a tenth form of the third example embodiment, the spinner body is directly coupled only with the slinger basket and the spinner body is directly coupled with the slinger basket by a retaining member and one or more fasteners.

In an eleventh form of the third example embodiment, the drive shaft and the spinner body are not directly coupled with one another, and the spinner body is directly coupled only with the slinger basket and the spinner body is directly coupled with the slinger basket by a retaining member and one or more fasteners.

In a twelfth form of the third example embodiment, the rotary spinner is provided in combination with a drive shaft, wherein the drive shaft is only directly coupled with the slinger basket.

In a thirteenth form of the third example embodiment, the rotary spinner is provided in combination with a drive shaft, wherein the drive shaft is only directly coupled with the slinger basket, and the slinger basket is directly coupled with the drive shaft by an upper retaining member, a lower retaining member, and a plurality of fasteners which clamp the slinger basket between the upper retaining member and the lower retaining member.

In a fourteenth form of the third example embodiment, the roof of the spinner body is substantially perpendicular to the axis of the drive shaft. Further forms include the fourteenth form in combination with any one of the first through twelfth forms of the first example embodiment.

In a fifteenth form of the third example embodiment, the upper flange is substantially parallel with the roof and an upper surface of the upper flange contacts a lower surface of the roof. Further forms include the fifteenth form in combination with any one of the first through twelfth forms of the first example embodiment.

In a sixteenth form of the third example embodiment, the roof of the spinner body is substantially perpendicular to the axis of the drive shaft, and the upper flange is substantially parallel with the roof and an upper surface of the upper flange contacts a lower surface of the roof. Further forms include the sixteenth form in combination with any one of the first through twelfth forms of the first example embodiment.

In a seventeenth form of the third example embodiment, the roof of the spinner body is substantially perpendicular to the axis of the drive shaft, and/or the upper flange is substantially parallel with the roof and an upper surface of the upper flange contacts a lower surface of the roof, and the rotary spinner further includes a retaining member positioned above the roof and a plurality of fasteners extending into holes in the retaining member, the roof and the upper flange to couple the slinger basket and the spinner body.

Further forms include the seventeenth form in combination with any one of the first through twelfth forms of the first example embodiment.

In an eighteenth form of the third example embodiment, the roof of the spinner body is substantially perpendicular to the axis of the drive shaft, and/or the upper flange is substantially parallel with the roof and an upper surface of the upper flange contacts a lower surface of the roof, and the rotary spinner further includes a retaining member positioned above the roof and a plurality of fasteners extending into holes in the retaining member, the roof and the upper flange to couple the slinger basket and the spinner body, and the fasteners impart a clamping force permitting relative movement between the upper flange and the roof during thermal expansion and contraction. Further forms include the eighteenth form in combination with any one of the first through twelfth forms of the first example embodiment.

A nineteenth form of the third example embodiment, includes one or more of: (a) a first plurality of gussets provided in the slinger basket and extending axially between the base and the upper flange and radially inward from the interior side wall; (b) a second plurality of gussets provided in the spinner body and extending axially between the roof and the lower flange and radially inward from the spinner side wall; and (c) the first plurality of gussets provided in the slinger basket and extending axially between the base and the upper flange and radially inward from the spinner side wall and the second plurality of gussets provided in the spinner body and extending axially between the roof and the lower flange and radially inward from the spinner side wall. Further forms include the nineteenth form in combination with any one of the first through twelfth forms of the first example embodiment.

A fourth example embodiment is a system comprising the rotary spinner of the third example embodiment or the rotary spinner of any or any of the first through nineteenth forms of the third example embodiment; a drive shaft operatively coupled with the central drive aperture and rotatable about an axis extending in an axial direction; and a source of molten material positioned above the rotary spinner.

A fifth example embodiment is a method of operating a system comprising the rotary spinner of the third example embodiment, the rotary spinner of any of the first through nineteenth forms of the third example embodiment, a drive shaft operatively coupled with the central drive aperture and rotatable about an axis extending in an axial direction, and a source of molten material positioned above the rotary spinner; the method comprising: rotating the drive shaft to rotate the slinger basket and the spinner body; pouring molten material onto the base through the upper opening from a position radially outward from the rotary drive shaft and axially above the slinger basket; centrifugally flowing the molten material along the base to the side wall and up the side wall to the plurality of distribution holes; centrifugally streaming the molten material from the plurality of distribution holes to the spinner side wall as a plurality of streams spanning a structure free gap between the slinger basket and the to the spinner side wall; and centrifugally passing the molten material through the fiberizing holes to exit the rotary spinner.

A sixth example embodiment is a rotary spinner for producing fibers from molten material, the rotary spinner comprising: a slinger basket including a base extending radially outward from a central drive aperture structured to receive a rotary drive shaft, and a slinger side wall extending axially upward from the base and including a plurality of distribution holes defined therein; a spinner body including an axially extending spinner side wall including a plurality of fiberizing holes defined therein, an upper spinner flange extending radially inward from the spinner side wall and a lower spinner flange extending radially inward from the spinner side wall; and a plurality of spokes coupled with and extending between the slinger basket and the spinner body.

In a first form of the sixth example embodiment, the plurality of spokes are coupled with the slinger basket by a respective plurality of basket clevis joints.

In a second form of the third example embodiment, the plurality of spokes are coupled with the spinner body by a respective plurality of spinner body clevis joints.

In a third form of the sixth example embodiment, the plurality of spokes are coupled with the slinger basket by a respective plurality of basket clevis joints, and the plurality of spokes are coupled with the spinner body by a respective plurality of spinner body clevis joints.

In a fourth form of the sixth example embodiment, the plurality of spokes comprise a first plurality of spokes extending between an upper connection location of the slinger basket and an upper connection location of the spinner body and a second plurality of spokes extending between a lower connection location of the slinger basket and a lower connection location of the spinner body.

In a fifth form of the sixth example embodiment, the plurality of spokes comprise a first plurality of spokes extending between an upper connection location of the slinger basket and an upper connection location of the spinner body and a second plurality of spokes extending between a lower connection location of the slinger basket and a lower connection location of the spinner body, and one or more of: the upper connection location of the slinger basket is located at an intersection of the upper slinger flange and the slinger side wall, the upper connection location of the spinner body is located at an inner portion of the upper spinner flange, the lower connection location of the slinger basket is located at the intersection of the slinger side wall and the base, and the lower connection location of the spinner body is located at an inner portion of the lower spinner flange.

In a sixth form of the sixth example embodiment, the plurality of spokes comprise the only structure extending radially intermediate the slinger basket and the spinner body. Further forms include the sixth form in combination with any of the first through fifth forms of the sixth example embodiment.

In a seventh form of the sixth example embodiment, the plurality of spokes comprise the only structure coupling the slinger basket and the spinner body. Further forms include the seventh form in combination with any of the first through fifth forms of the sixth example embodiment.

In an eighth form of the sixth example embodiment, the plurality of spokes comprise the only structure extending radially intermediate the slinger basket and the spinner body. Further forms include the eighth form in combination with any of the first through fifth forms of the sixth example embodiment.

In a ninth form of the sixth example embodiment, the plurality of spokes comprise the only structure extending radially intermediate the slinger basket and the spinner body and the only structure coupling the slinger basket and the spinner body. Further forms include the ninth form in combination with any of the first through fifth forms of the ninth example embodiment.

In a tenth form of the sixth example embodiment, the slinger basket includes an upper basket opening spanning the base and providing a structure free flow path from a first location axially above the upper basket opening and radially outward from the central drive aperture to a second location on the base and radially outward from the central drive aperture. Further forms include the tenth form in combination with any of the first through fifth forms of the ninth example embodiment.

An eleventh form of the sixth example embodiment includes an upper slinger flange extending radially inward from an upper portion of the slinger side wall. Further forms include the eleventh form in combination with any of the first through fifth forms of the ninth example embodiment.

In a twelfth form of the sixth example embodiment, the spinner body is not directly coupled with the drive shaft, the spinner body is directly coupled only with the slinger basket, and only the slinger basket is directly coupled with the drive shaft. Further forms include the twelfth form in combination with any of the first through fifth forms of the ninth example embodiment.

In a thirteenth form of the sixth example embodiment, one or more of (a) the spinner body is not directly coupled with the drive shaft, (b) the spinner body is directly coupled only with the slinger basket, and (c) only the slinger basket is directly coupled with the drive shaft. Further forms include the thirteenth form in combination with any of the first through fifth forms of the ninth example embodiment.

A seventh example embodiment is a system comprising the rotary spinner of any of the sixth example embodiment, or any or any of the first through thirteenth forms of the sixth example embodiment; a drive shaft operatively coupled with the central drive aperture and rotatable about an axis extending in an axial direction; and a source of molten material positioned above the rotary spinner.

An eighth example embodiment is a method of operating a system comprising the rotary spinner of any of the sixth example embodiment, or any or any of the first through thirteenth forms of the sixth example embodiment; a drive shaft operatively coupled with the central drive aperture and rotatable about an axis extending in an axial direction; and a source of molten material positioned above the rotary spinner; the method comprising: rotating the drive shaft to rotate the slinger basket and the spinner body; pouring molten material onto the base from a position radially outward from the rotary drive shaft and axially above the slinger basket; centrifugally flowing the molten material along the base to the side wall and up the side wall to the plurality of distribution holes; centrifugally streaming the molten material from the plurality of distribution holes to the spinner side wall as a plurality of streams spanning a structure free gap between the slinger basket and the spinner side wall; and centrifugally passing the molten material through the fiberizing holes to exit the rotary spinner.

While illustrative embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It shall be understood that the term substantially as used herein in connection with a structure or function confirms that the structure or function encompasses and includes variation(s) in degree, magnitude, scope, shape, position, operation or other physical or functional parameters that do not impair the structural or functional purpose of the structure or function at hand including, for example, margins of error, uncertainty or variation understood by a person of skill in the art with respect to the structure or function at hand. It shall be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system for producing fibers from molten material, the system comprising:
    a drive shaft rotatable about an axis extending in an axial direction;
    a slinger basket including a base, a side wall, an upper flange, and an interior void, the base extending radially outward from a joint operatively coupling the drive shaft and the slinger basket, the side wall extending axially upward from the base and including a plurality of distribution holes defined therein, the upper flange extending radially from the side wall, the interior void extending radially from the drive shaft to the side wall and extending axially from the base to an upper opening, the upper opening extending radially outward from the drive shaft toward the upper flange; and
    a spinner body coupled with the slinger basket, the spinner body including a roof contacting and extending radially outward from the upper flange such that the upper opening is substantially unobstructed by the spinner body, a spinner side wall extending axially downward from the roof and including a fiberizing region including a plurality of fiberizing holes provided therein, and a lower flange extending radially inward from the spinner side wall.

2. The system of claim 1 wherein the plurality of fiberizing holes are provided in a fiberizing region of the side wall extending from a lower axial height to an upper axial height, and the plurality of distribution holes are positioned to direct a corresponding plurality of streams of molten material onto the fiberizing region of the side wall during rotation of the slinger basket and the spinner body.

3. The system of claim 2 wherein the plurality of distribution holes are positioned to direct the plurality of streams of molten material onto only an axially upper portion of the fiberizing region.

4. The system of claim 3 wherein the axially upper portion comprises an axially upper 50% or less of the fiberizing region.

5. The system of claim 3 wherein the plurality of distribution holes consist essentially of two rows of distribution holes.

6. The system of claim 2 wherein the plurality of distribution holes are positioned to direct the plurality of streams of molten material onto substantially all of the fiberizing region.

7. The system of claim 6 wherein the plurality of distribution holes consist essentially of four rows of distribution holes.

8. The system of claim 1 wherein the distribution holes are sized and positioned such that, during rotation of the slinger basket and the spinner body, molten material dropped into the upper opening from a position radially outward from the rotary drive shaft follows a flow path extending along the base of the slinger basket to the side wall of the slinger basket, along the side wall of the slinger basket to the plurality of distribution holes, from the plurality of distribution holes to the spinner side wall as a plurality of streams spanning a structure free gap between the slinger basket and the spinner side wall, and through the fiberizing holes to exit the rotary spinner.

9. The system of claim 1 wherein the spinner body is not directly coupled with the drive shaft.

10. The system of claim 1 wherein the spinner body is directly coupled only with the slinger basket and the spinner body is directly coupled with the slinger basket by a retaining member and one or more fasteners.

11. The system of claim 1 wherein only the slinger basket is directly coupled with the drive shaft.

12. The system of claim 11 wherein the slinger basket is directly coupled with the drive shaft by an upper retaining member, a lower retaining member, and a plurality of fasteners which clamp the slinger basket between the upper retaining member and the lower retaining member.

13. The system of claim 1 wherein the roof of the spinner body is substantially perpendicular to the axis of the drive shaft.

14. The system of claim 13 wherein the upper flange is substantially parallel with the roof and an upper surface of the upper flange contacts a lower surface of the roof.

15. The system of claim 14 comprising a retaining member positioned above the roof and a plurality of fasteners extending into holes in the retaining member, the roof and the upper flange to couple the slinger basket and the spinner body.

16. The system of claim 15 wherein the fasteners impart a clamping force permitting relative movement between the upper flange and the roof during thermal expansion and contraction.

17. The system of claim 1 comprising one of:
(a) a first plurality of gussets provided in the slinger basket and extending axially between the base and the upper flange and radially inward from the interior side wall;
(b) a second plurality of gussets provided in the spinner body and extending axially between the roof and the lower flange and radially inward from the spinner side wall; and
(c) the first plurality of gussets provided in the slinger basket and extending axially between the base and the upper flange and radially inward from the spinner side wall and the second plurality of gussets provided in the spinner body and extending axially between the roof and the lower flange and radially inward from the spinner side wall.

18. A rotary spinner for producing fibers from molten material, the rotary spinner comprising:
a slinger basket including a base extending radially outward from a central drive aperture structured to receive a rotary drive shaft, a side wall extending axially upward from the base and including a plurality of distribution holes defined therein, and an upper flange extending from the side wall and to an upper basket opening spanning the base; and
a spinner body including a roof coupled directly with the upper flange and extending radially outward from the upper basket opening, the upper basket opening being substantially uncovered by the roof, a spinner side wall extending axially downward from the roof and including a plurality of fiberizing holes defined therein, and a lower flange extending radially inward from the spinner side wall to a lower spinner opening.

19. The rotary spinner of claim 18 wherein the plurality of fiberizing holes are provided in a fiberizing region of the side wall extending between a lower axial height and an upper axial height, and the plurality of distribution holes are positioned to direct a corresponding plurality of streams of molten material onto the fiberizing region of the side wall during rotation of the slinger basket and the spinner body.

20. The rotary spinner of claim 19 wherein the plurality of distribution holes are positioned to direct the plurality of streams of molten material onto only an axially upper portion of the fiberizing region.

21. The rotary spinner of claim 20 wherein the axially upper portion comprises substantially an axially upper 50% or less of the fiberizing region.

22. The rotary spinner of claim 19 wherein the plurality of distribution holes comprises two rows of distribution holes.

23. The rotary spinner of claim 19 wherein the plurality of distribution holes are positioned to direct the plurality of streams of molten material onto substantially all of the fiberizing region.

24. The rotary spinner of claim 23 wherein the plurality of distribution holes comprise four rows of distribution holes.

25. The rotary spinner of claim 18 wherein the distribution holes are sized and positioned such that, during rotation of the slinger basket and the spinner body, molten material dropped into the upper basket opening from a position radially outward from the rotary drive shaft follows a flow path extending along the base of the slinger basket to the side wall of the slinger basket, along the side wall of the slinger basket to the plurality of distribution holes, from the plurality of distribution holes to the spinner side wall as a plurality of streams spanning a structure free gap between the slinger basket and the spinner side wall, and through the fiberizing holes to exit the rotary spinner.

26. The rotary spinner of claim 18 wherein the drive shaft and the spinner body are not directly coupled with one another.

27. The rotary spinner of claim 18 wherein the spinner body is directly coupled only with the slinger basket and the spinner body is directly coupled with the slinger basket by a retaining member and one or more fasteners.

28. The rotary spinner of claim 18 in combination with a drive shaft, wherein the drive shaft is only directly coupled with the slinger basket.

29. The rotary spinner of claim 28 wherein the slinger basket is directly coupled with the drive shaft by an upper retaining member, a lower retaining member, and a plurality of fasteners which clamp the slinger basket between the upper retaining member and the lower retaining member.

30. The rotary spinner of claim 18 wherein the roof of the spinner body is substantially perpendicular to the axis of the drive shaft.

31. The rotary spinner of claim 30 wherein the upper flange is substantially parallel with the roof and an upper surface of the upper flange contacts a lower surface of the roof.

32. The rotary spinner of claim 31 comprising a retaining member positioned above the roof and a plurality of fasteners extending into holes in the retaining member, the roof and the upper flange to couple the slinger basket and the spinner body.

33. The rotary spinner of claim 32 wherein the fasteners impart a clamping force permitting relative movement between the upper flange and the roof during thermal expansion and contraction.

* * * * *